(12) United States Patent
Shibata et al.

(10) Patent No.: US 7,849,672 B2
(45) Date of Patent: Dec. 14, 2010

(54) FAILURE DIAGNOSIS METHOD FOR REDUCING AGENT ADDITION VALVE

(75) Inventors: Daisuke Shibata, Numazu (JP); Hiroshi Sawada, Gotenba (JP); Satoru Maeda, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 904 days.

(21) Appl. No.: 11/790,028

(22) Filed: Apr. 23, 2007

(65) Prior Publication Data
US 2008/0034742 A1     Feb. 14, 2008

(30) Foreign Application Priority Data
Apr. 26, 2006   (JP) .............................. 2006-122609

(51) Int. Cl.
F01N 3/00   (2006.01)
(52) U.S. Cl. .............................. 60/277; 60/286; 60/295
(58) Field of Classification Search ................... 60/277, 60/286
See application file for complete search history.

(56) References Cited

FOREIGN PATENT DOCUMENTS

| | | | |
|---|---|---|---|
| EP | 1176295 A2 * | 1/2002 | |
| JP | A 11-062686 | 3/1999 | |
| JP | 2002038940 A * | 2/2002 | |
| JP | A 2002-038928 | 2/2002 | |
| JP | A 2002-161733 | 6/2002 | |
| JP | A 2003-172185 | 6/2003 | |
| JP | A 2003-254048 | 9/2003 | |
| JP | A 2005-054723 | 3/2005 | |
| JP | 2005232991 A * | 9/2005 | |

* cited by examiner

*Primary Examiner*—Thomas E Denion
*Assistant Examiner*—Jason Shanske
(74) *Attorney, Agent, or Firm*—Oliff & Berridge, PLC

(57) ABSTRACT

An object of the invention is to diagnose a failure of an addition valve provided in the exhaust system of an internal combustion engine. To achieve the object, post injection through a fuel injection valve of the internal combustion engine and reducing agent addition through the reducing agent addition valve are performed at different timings, the quantity of fuel injected through the fuel injection valve when the post injection is performed and the quantity of reducing agent added through the reducing agent addition valve when the reducing agent addition is performed are estimated based on a same parameter, and it is diagnosed that the reducing agent addition valve has a failure on condition that the difference between the estimated fuel quantity and the estimated reducing agent quantity exceeds a predetermined quantity.

17 Claims, 12 Drawing Sheets

FAILURE DIAGNOSIS METHOD FOR REDUCING AGENT ADDITION VALVE

TECHNICAL FIELD

The present invention relates to a technology of diagnosing a failure of a reducing agent addition valve provided in the exhaust system of an internal combustion engine.

BACKGROUND ART

In recent years, the exhaust system of some internal combustion engines is equipped with an addition valve for adding a reducing agent such as fuel into the exhaust gas. As a technique of diagnosing a failure of such an addition valve, there is a known method of diagnosing a failure of such a reducing agent addition valve in which the air-fuel ratio of the exhaust gas into which reducing agent has been added through the addition valve is detected and a failure of the addition valve is diagnosed by comparing the air-fuel ratio of the exhaust gas thus detected and a reference value (see, for example, Japanese Patent Application Laid-Open No. 2002-38928).

Japanese Patent Application Laid-Open No. 2002-161733 discloses a diagnosis technique in which the quantity of reducing agent added is feedback-controlled so that the air-fuel ratio of the exhaust gas flowing into a catalyst becomes equal to a target air-fuel ratio, and when a correction amount in the feedback control exceeds a threshold value, it is determined that the performance of the reducing agent addition valve is significantly deteriorated.

Japanese Patent Application Laid-Open No. 11-62686 discloses a diagnosis technique in which if the temperature difference between the downstream of a catalyst and the upstream of the catalyst becomes equal to or larger than a predetermined value when a reducing agent is supplied to the catalyst through a fuel injection valve of an internal combustion engine, it is determined that the fuel injection system is in an abnormal condition.

Japanese Patent Application Laid-Open No. 2005-54723 discloses a diagnosis technique in which the quantity of reducing agent added through an addition valve is estimated based on a value detected by an air-fuel ratio sensor, and an abnormality determination is made by comparing the estimated value and a criterion.

Japanese Patent Application Laid-Open No. 2003-254048 discloses a diagnosis technique in which when the time period during which the output of the air-fuel ratio sensor is equal to or smaller than a predetermined value becomes longer than a predetermined time period, it is determined that the fuel addition valve is in an abnormal condition.

Japanese Patent Application Laid-Open No. 2003-172185 discloses a system adapted to learn values of the quantity of post injection through a fuel injection valve and the quantity of reducing agent added through an addition valve with which temperature raising effects suitable for different operating states of the internal combustion engine can be achieved.

DISCLOSURE OF THE INVENTION

Detection values obtained by an air-fuel ratio sensor and other sensors after reducing agent has been added through a reducing agent addition valve vary depending not only on the quantity of the reducing agent added through the reducing agent addition valve but also on various factors. For example, they vary depending on output errors of sensors such as a sensor for detecting the air-fuel ratio of the exhaust gas and a sensor for detecting the intake air quantity in the internal combustion engine. For this reason, it is not easy to improve the accuracy of failure diagnosis with the above described conventional methods.

The present invention has been made in view of the above described situations and has as an object to provide a technique that enables diagnosis of a failure of a reducing agent addition valve provided in the exhaust system of an internal combustion engine with high accuracy.

To achieve the above described object, according to the present invention, there is provided a failure diagnosis method for a reducing agent addition valve that adds a reducing agent into the exhaust gas of an internal combustion engine, in which post injection through a fuel injection valve of the internal combustion engine and reducing agent addition through the reducing agent addition valve are performed at different timings, the quantity of fuel actually injected through the fuel injection valve when the post injection is performed and the quantity of reducing agent actually added through the reducing agent addition valve when the reducing agent addition is performed are estimated based on a same parameter, and it is diagnosed that the reducing agent addition valve has a failure on condition that the difference between the estimated fuel quantity and the estimated reducing agent quantity is equal to or larger than a predetermined quantity.

According to this method, the estimated quantity of the fuel actually injected by post injection through the fuel injection valve (which quantity will be hereinafter referred to as the estimated post injection quantity) and the estimated quantity of the reducing agent actually added through the reducing agent addition valve (which quantity will be hereinafter referred to as the estimated addition quantity) are estimated based on the same parameter. If there is a measurement error or the like in the parameter, the estimated post injection quantity and the estimated addition quantity contain the equivalent measurement error or the like. Consequently, the measurement error or the like is cancelled in the difference between the estimated post injection quantity and the estimated addition quantity.

Therefore, in the case where failure diagnosis for the reducing agent addition valve is performed based on the difference between the estimated post injection quantity and the estimated addition quantity, failure diagnosis for the reducing agent addition valve can be carried out accurately even when there is a measurement error or the like in the parameter. Thus, a failure of an addition valve attached to the exhaust system of an internal combustion engine can be diagnosed with high accuracy.

As a specific failure diagnosis method, for example, it may be diagnosed that the reducing agent addition valve has a failure on condition that the difference between the estimated post injection quantity and the estimated addition quantity exceeds a predetermined quantity.

In the diagnosis method for a reducing agent addition valve according to the present invention, the aforementioned different timings may be, for example, different timings in different addition periods or different timings in the same addition period.

Here, the addition period refers to a period during which fuel or reducing agent is supplied continuously to the exhaust system (e.g. an exhaust gas purification catalyst) of the internal combustion engine. Accordingly, in the case where the aforementioned different timings are in different addition periods, only one of post injection through the fuel injection valve and reducing agent addition through the reducing agent addition valve is performed in each addition period. In the case where the aforementioned different timings are in the same addition period, both of post injection through the fuel injection valve and reducing agent addition through the reducing agent addition valve are performed in the same addition period.

In the case where post injection through the fuel injection valve and reducing agent addition through the reducing agent addition valve are performed at different timings in the same addition period, various conditions such as the operating condition of the internal combustion engine are substantially the same at the time of executing post injection and at the time of executing reducing agent addition.

In the latter case, a difference in values of the aforementioned parameter is hardly caused by factors other than a difference between the actual post injection quantity and the actual reducing agent addition quantity. Therefore, the accuracy of failure diagnosis for the reducing agent addition valve can be further enhanced.

The aforementioned predetermined quantity may be determined based on the difference (which will be hereinafter referred to as the prescribed quantity difference) between the post injection quantity prescribed for the fuel injection valve (which quantity will be hereinafter referred to as the prescribed post injection quantity) and the addition quantity prescribed for the reducing agent addition valve (which quantity will be hereinafter referred to as the prescribed addition quantity).

In other words, it may be diagnosed that the reducing agent addition valve has a failure if the difference (which will be hereinafter referred to as the estimated difference) between the estimated post injection quantity and the estimated addition quantity is significantly different from the prescribed quantity difference.

When the aforementioned prescribed quantity difference is large, there is a possibility that the magnitude of error contained in the estimated post injection quantity and the magnitude of error contained in the estimated addition quantity are different from each other. In view of this, the accuracy of failure diagnosis can be further improved by performing the diagnosis at a time when the aforementioned prescribed quantity difference is smaller than or equal to a specific value, or more preferably, when the prescribed quantity difference is substantially zero.

In the failure diagnosis method for a reducing agent addition valve according to the present invention, the parameter used in estimating the estimated post injection quantity and the estimated addition quantity may be, for example, a measurement value of an air-fuel ratio sensor attached to an exhaust passage of the internal combustion engine.

If the quantity of exhaust gas discharged from the internal combustion engine (or the quantity of intake air) and the quantity of the injected fuel consumed in combustion of the internal combustion engine are the invariable, the actual post injection quantity and the actual reducing agent addition quantity correlate with the measurement value of the air-fuel ratio sensor.

Therefore, if the quantity of the exhaust gas discharged from the internal combustion engine and the quantity of the injected fuel consumed in combustion of the internal combustion engine are the same at the time when post injection by the fuel injection valve is performed and at the time when reducing agent addition by the reducing agent addition valve is performed, a failure of the reducing agent addition valve can be diagnosed by comparing the measurement value of the air-fuel ratio sensor at the time of the post injection and the measurement value of the air-fuel ratio sensor at the time of the reducing agent addition.

On the other hand, in cases where the quantity of the exhaust gas discharged from the internal combustion engine and the quantity of the injected fuel consumed in combustion of the internal combustion engine at the time when post injection by the fuel injection valve is performed and those at the time when reducing agent addition by the reducing agent addition valve is performed are different from each other, the measurement value of an intake air quantity sensor provided in the intake passage of the internal combustion engine, the measurement value of the air-fuel ratio sensor attached to the exhaust passage of the internal combustion engine and the quantity of the injected fuel consumed in combustion of the internal combustion engine may be used as parameters in estimating the estimated post injection quantity and the estimated addition quantity.

In such cases, the estimated post injection quantity and the estimated addition quantity can be calculated (or estimated) by dividing the measurement value of the intake air quantity sensor by the measurement value of the air-fuel ratio sensor and subtracting the fuel injection quantity (the quantity of fuel injected at times other than post injection) from the result of the division at the time when post injection through the fuel injection valve is performed and at the time when reducing agent addition through the reducing agent addition valve is performed respectively.

In the failure diagnosis method for a reducing agent addition valve according to the present invention, in the case where the measurement value of the air-fuel ratio sensor is used in estimating the estimated post injection quantity and the estimated addition quantity, the estimation of the estimated post injection quantity and the estimated addition quantity may be performed on condition that the air-fuel ratio of the exhaust gas is higher than the theoretical air-fuel ratio.

This is because when the air-fuel ratio of the exhaust gas becomes lower than the theoretical air-fuel ratio due to post injection through the fuel injection valve and addition of reducing agent through the reducing agent addition valve, there is a possibility that the degree of correlation between the actual post injection quantity or the actual reducing agent addition quantity and the measurement value of the air-fuel ratio sensor becomes low due to oxygen storage ability (so-called $O_2$ storage ability) of the exhaust gas purification catalyst, various oxidation and reduction reactions (e.g. NOx reduction reaction) in the exhaust gas purification catalyst and/or slipping of surplus reducing agent or fuel through the exhaust gas purification catalyst without being oxidized.

The estimated post injection quantity and the estimated addition quantity calculated in the failure diagnosis method according to the present invention can be used in subsequent control of the reducing agent addition valve.

Foe example, the prescribed addition quantity in the subsequent process may be determined based on the ratio of the estimated post injection quantity to the estimated addition quantity. More specifically, the target addition quantity of the reducing agent addition valve may be corrected based on the ratio of the estimated post injection quantity to the estimated addition quantity, and the corrected target addition quantity may be used as the prescribed addition quantity.

In this case, since the prescribed addition quantity is determined using as a reference the estimated post injection quantity that contains an error equivalent to that in the estimated addition quantity, the actual reducing agent addition quantity can be made close to the target addition quantity even when an error such as a measurement error of a parameter used in estimating the estimated addition quantity occurs.

In the failure diagnosis method according to the present invention, in the case where it is diagnosed that the reducing agent addition valve is working properly, a failure of an exhaust gas temperature sensor, the intake air quantity sensor and the air fuel ratio sensor can also be diagnosed by the process described below. Here, the exhaust gas temperature sensor is assumed to be provided in the exhaust passage at a point downstream of the exhaust purification catalyst.

The reducing agent added through the reducing agent addition valve is oxidized in the exhaust gas purification catalyst, and the temperature of the exhaust gas purification catalyst is increased by the reaction heat generated thereby. The rise in the temperature of the exhaust gas purification catalyst leads to a rise in the temperature of the exhaust gas flowing out of the exhaust gas purification catalyst. The rise in the temperature of the exhaust gas correlates with the quantity of the reducing agent added through the reducing agent addition valve.

When the reducing agent addition valve is working properly, the rise in the temperature of the exhaust gas correlates with the prescribed addition quantity. Therefore, when the rise in the temperature of the exhaust gas measured by the exhaust gas temperature sensor is not commensurate with the prescribed addition quantity, it may be considered that the exhaust gas temperature sensor has a failure.

In the case where the reducing agent addition valve is controlled so that the air-fuel ratio of the exhaust gas becomes equal to a predetermined air fuel ratio, the prescribed addition quantity is determined using the measurement value of the intake air quantity sensor, the fuel injection quantity of the fuel injection valve and the above mentioned predetermined air-fuel ratio as parameters. Accordingly, if the reducing agent addition valve and the intake air quantity sensor are working properly, the air-fuel ratio of the exhaust gas becomes substantially equal to the predetermined air-fuel ratio. Conversely, if the air-fuel ratio of the exhaust gas is significantly different from the predetermined air-fuel ratio, it may be considered that the reducing agent addition valve or the intake air quantity sensor has a failure.

Therefore, in the case where the reducing agent addition valve is controlled so that the air-fuel ratio of the exhaust gas becomes equal to a predetermined air fuel ratio, if the air-fuel ratio of the exhaust gas is significantly different from the predetermined air-fuel ratio and the reducing agent addition valve is working properly, it may be considered that the intake air quantity sensor has a failure.

If the reducing agent addition valve, the intake air quantity sensor and the air-fuel ratio sensor are working properly, the estimated addition quantity becomes substantially equal to the prescribed addition quantity. Conversely, if the estimated addition quantity is significantly different from the prescribed addition quantity, it may be considered that at least one of the reducing agent addition valve, the intake air quantity sensor and the air-fuel ratio sensor has a failure.

Therefore, if the estimated addition quantity estimated at a time when the reducing agent addition valve and the intake air quantity sensor are working properly is significantly different from the prescribed addition quantity, it may be considered that the air fuel ratio sensor has a failure.

BEST MODE FOR CARRYING OUT THE INVENTION

In the following, specific embodiments of the present invention will be described with reference to the accompanying drawings.

First Embodiment

Figure 1:
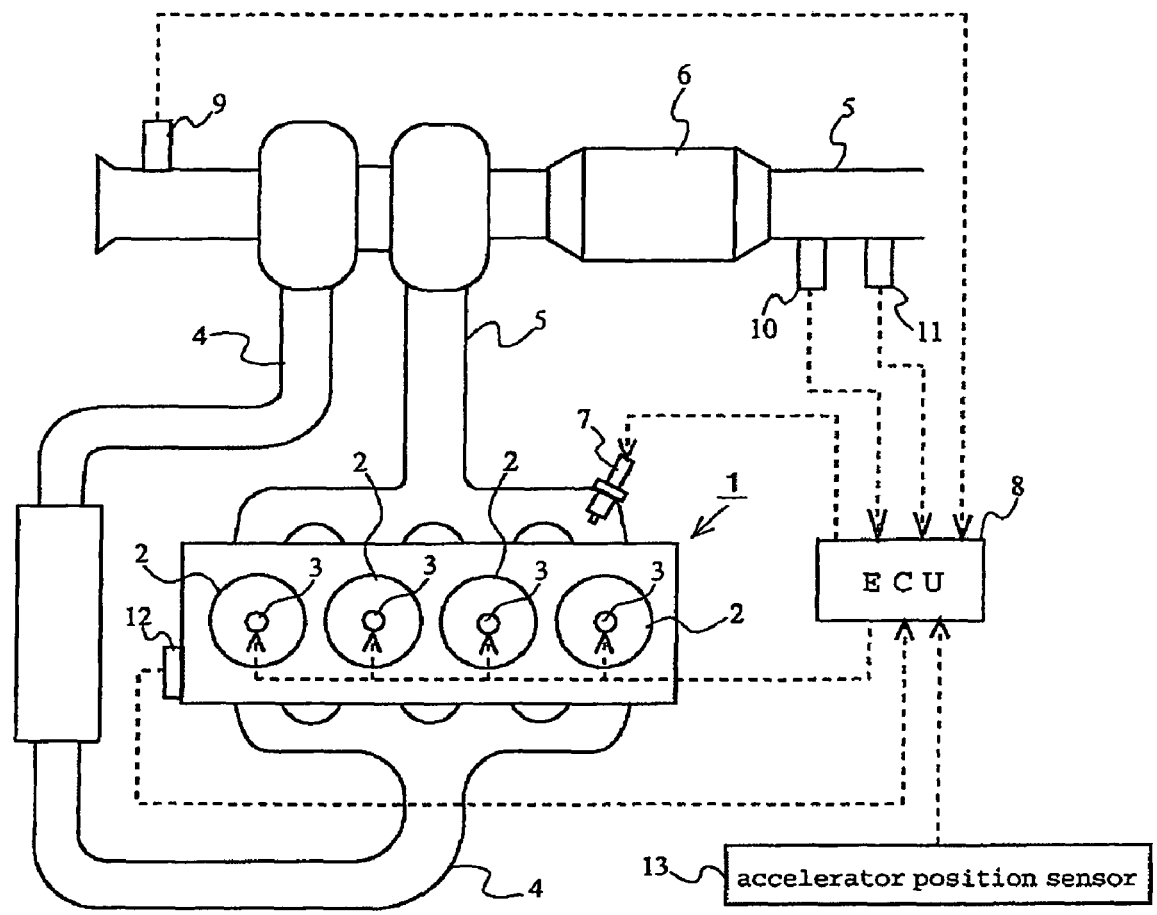
FIG. 1 illustrates the general structure of an internal combustion engine to which the present invention is applied.

A first embodiment of the present invention will be described with reference to FIGS. 1 to 3. FIG. 1 schematically shows the general structure of an internal combustion engine to which the present invention is applied. The internal combustion engine 1 shown in FIG. 1 is a compression ignition type internal combustion engine (diesel engine) having four cylinders 2.

The internal combustion engine 1 is provided with a fuel injection valves 3 that can inject fuel directly into the respective cylinders 2 and an intake passage 4 for introducing air to the cylinders 2. The mixture of air introduced into each cylinder 2 from the intake passage 4 and fuel injected through the fuel injection valve 3 is ignited and burned.

The gas burned in each cylinder 2 (burned gas) is discharged to an exhaust passage 5. The exhaust gas discharged to the exhaust passage 5 is purified by an exhaust gas purification catalyst 6 provided at some midpoint in the exhaust passage 5 and then emitted to the atmosphere.

The exhaust gas purification catalyst 6 may be, for example, an NOx storage reduction catalyst having an oxidizing ability and an NOx storage ability, a particulate filter having an oxidizing ability and a particulate matter trapping ability, or a particulate filter that bears an NOx storage reduction catalyst.

At some point upstream of the exhaust gas purification catalyst 6, the exhaust passage 5 is provided with a reducing agent addition valve 7 for adding a reducing agent into the exhaust gas that flows in the exhaust passage 5. The reducing agent added through the reducing agent addition valve 7 may be fuel of the internal combustion engine 1.

The operating state of the internal combustion engine 1 is controlled electrically by an ECU 8. In doing so, the ECU 8 controls the operation of the fuel injection valves 3 and the reducing agent addition valves 7 using various parameters such as the measurement value of an air flow meter (or intake air quantity sensor) 9 provided in the intake passage 4, the measurement value of an exhaust gas temperature sensor 10 provided at some point in the exhaust passage 5 downstream of the exhaust gas purification catalyst 6, the measurement value of an A/F sensor (air-fuel ratio sensor) 11 attached to the exhaust passage 5 at some point downstream of the exhaust gas purification catalyst 6, the measurement value of a crank position sensor 12 attached to the internal combustion engine 1 and the measurement value of an accelerator position sensor 13.

For example, when regeneration process for cleaning away and/or removing NOx and particulate matter stored or trapped in the exhaust gas purification catalyst 6 is performed, the ECU 8 causes the reducing agent addition valve 7 to add fuel into the exhaust gas thereby cleaning away and/or removing the NOx and particulate matter stored or trapped in the exhaust gas purification catalyst 6.

When the regeneration process for the exhaust gas purification catalyst 6 is performed, if the reducing agent addition valve 7 does not function in a manner as commanded by the ECU 8, there is a possibility that an increase in harmful exhaust emissions and/or deterioration in the fuel economy result.

If the quantity of fuel actually added through the reducing agent addition valve 7 is smaller than the quantity of fuel prescribed by the ECU 8 for the reducing agent addition valve 7 (which quantity will be hereinafter referred to as the prescribed addition quantity), the NOx storage capacity of the exhaust gas purification catalyst 6 may saturate or the pressure loss across the exhaust gas purification catalyst 6 may become unduly large, in some cases. In such cases, problems such as an in crease in the amount of NOx emission to the atmosphere and a rise in the back pressure are caused. On the other hand, if the quantity of fuel actually added through the reducing agent addition valve 7 is larger than the prescribed addition quantity, there is a possibility that surplus fuel is emitted to the atmosphere or the temperature of the exhaust gas purification catalyst 6 rises excessively.

If operation of the internal combustion engine 1 continues with the reducing agent addition valve 7 being in trouble, various problems will be caused along with the valve trouble. Therefore, it is necessary to diagnose a failure of the reducing agent addition valve 7 with high accuracy.

In an already developed method of diagnosing a failure of a reducing agent addition valve 7, the quantity of fuel actually added through the reducing agent addition valve 7 is estimated, and if the difference between the estimated quantity (estimated addition quantity) and the prescribed addition quantity is larger than a permissible value, it is diagnosed that the reducing agent addition valve has a failure.

Here, a method of estimating the quantity of fuel added through the reducing agent addition valve 7 will be described with reference to FIG. 2. FIG. 2 shows the prescribed addition quantity (timing of opening/closing the reducing agent addition valve 7) sent to the reducing agent addition valve 7 from the ECU 8 and the measurement value of the A/F sensor 11 (A/F) in relation to the same time axis.

Figure 2:
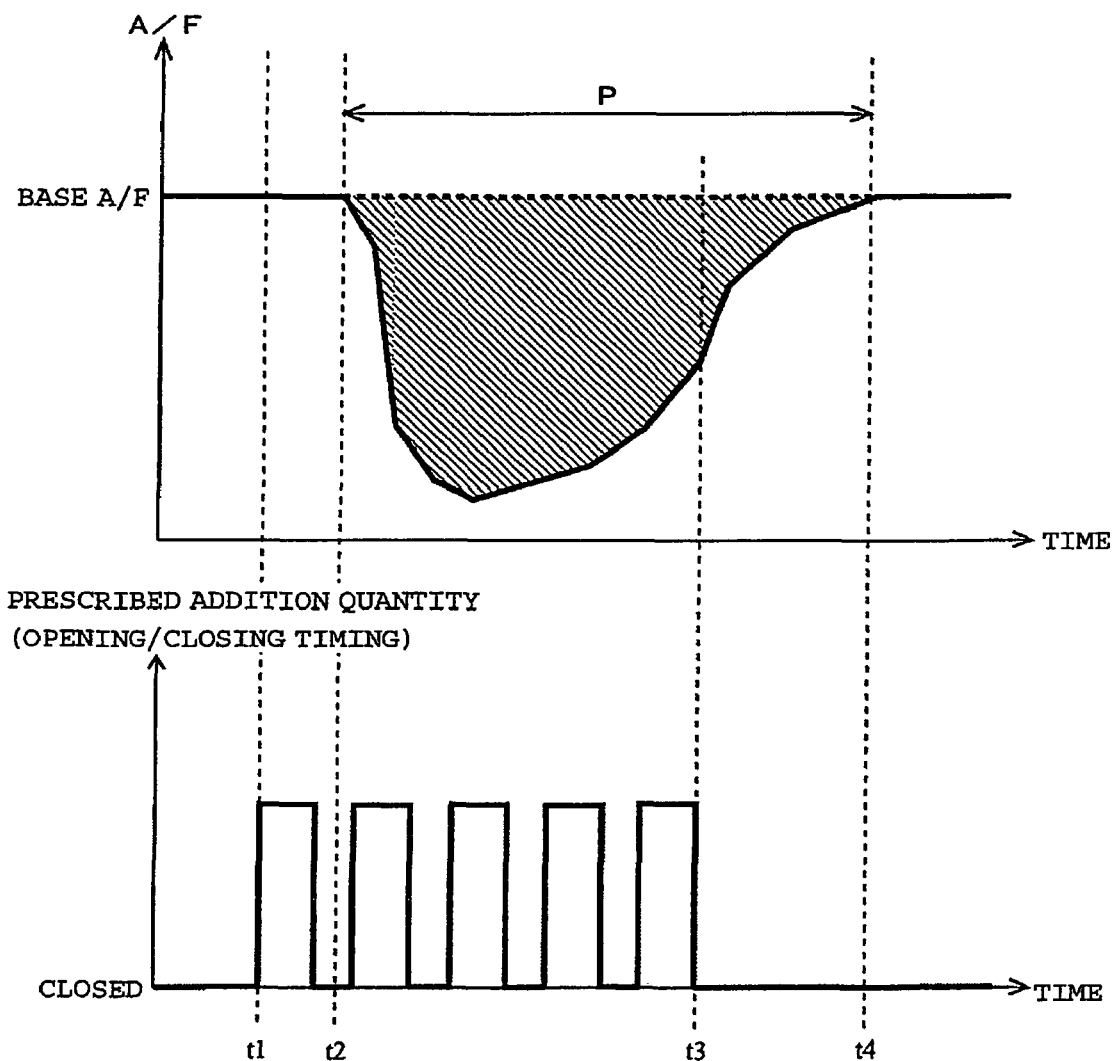
FIG. 2 is a diagram illustrating the concept of a method of estimating the estimated addition quantity.

Referring to FIG. 2, the ECU 8 starts a control process for opening and closing the reducing agent addition valve 7 according to a desired prescribed addition quantity at some time while the internal combustion engine 1 is in a stationary operating state (at time t1 in FIG. 2). When the reducing agent addition valve 7 starts to be opened and closed according to a command from the ECU 8, fuel is added to the exhaust gas through the reducing agent addition valve 7.

The fuel added to the exhaust gas through the reducing agent addition valve 7 (which will be simply referred to as the added fuel hereinafter) reaches the A/F sensor 11 with a delay associated with transportation. When the added fuel reaches the A/F sensor 11, the measurement value of the A/F sensor 11 starts to decrease from the base A/F (that is, the air-fuel ratio of the air-fuel mixture having been burned in the internal combustion engine 1) (at time t2 in FIG. 2).

After the control process for opening and closing the reducing agent addition valve 7 by the ECU 8 is terminated (at time t3 in FIG. 2), the measurement value of the A/F sensor 11 returns to the base A/F (at time t4 in FIG. 2) with a time delay associated with transportation of added fuel.

The integrated sum total of the difference between the base A/F and the measurement value of the A/F sensor 11 over the time period from the time (t2 in FIG. 2) at which the measurement value of the A/F sensor 11 starts decrease from the base A/F to the time (t4 in FIG. 2) at which the measurement value returns to the base A/F is indicative of the quantity of fuel actually added through the reducing agent addition valve 7. (This integrated sum total is represented as the hatched area in FIG. 2.)

The area of the hatched portion in FIG. 2 can be estimated by calculation using the following equation (1).

$$Qad = \Sigma(Ga/Maf - Inj) \qquad (1)$$

where Qad is the estimated addition quantity, Ga is the measurement value of the air flow meter 9, Maf is the measurement value of the A/F sensor 11 and Inj is the quantity of fuel prescribed for the fuel injection valve 3 by the ECU 8.

The estimated addition quantity Qad determined by the above described method contains errors such as a measurement error of the A/F sensor 11, a measurement error of the air flow meter 9, and an error in the quantity of fuel injected by the fuel injection valve 3. Accordingly, the difference between the estimated addition quantity Qad and the prescribed addition quantity can sometimes be larger than the permissible value even when the reducing agent addition valve 7 is working properly, and the difference between the estimated addition quantity Qad and the prescribed addition quantity can sometimes be smaller than or equal to the permissible value even when the reducing agent addition valve 7 has a failure.

In view of the above, in this embodiment, the ECU 8 causes the fuel injection valve 3 to perform post injection in a fuel addition period that is different from the fuel addition period of the reducing agent addition valve 7 (i.e. the period between t1 and t3 in FIG. 2) and estimates the quantity of fuel actually injected through the fuel injection valve 3 by post injection based on the method same as that used in obtaining the estimated addition quantity Qad. The ECU 8 is adapted to make a diagnosis that the reducing agent addition valve 7 has a failure if the difference between the estimated quantity of the fuel injected by post injection (with will be hereinafter referred to as the estimated post injection quantity) and the estimated addition quantity Qad is larger than predetermined quantity. In connection with this, the post injection quantity prescribed for the fuel injection valve 3 by the ECU 8 is assumed to be substantially equal to the addition quantity prescribed for the reducing agent addition valve 7 by the ECU 8.

The estimated post injection quantity contains errors such as a measurement error of the A/F sensor 11, a measurement error of the air flow meter 9, and an error in the quantity of fuel injected by the fuel injection valve 3. Since the estimated addition quantity Qad also contains errors equivalent to these errors, these errors are cancelled in the difference between the estimated post injection quantity and the estimated addition quantity Qad.

Therefore, by performing diagnosis of a failure of the reducing agent addition valve 7 using as a parameter the difference between the estimated post injection quantity and the estimated addition quantity Qad, accurate failure diagnosis can be achieved even when there are errors such as a measurement error of the A/F sensor 11, a measurement error of the air flow meter 9, and an error in the quantity of fuel injected by the fuel injection valve 3.

In the following, the failure diagnosis method for the reducing agent addition valve 7 according to the present invention will be described with reference to the flow chart of FIG. 3. FIG. 3 is the flow chart of a failure diagnosis routine for diagnosing a failure of the reducing agent addition valve 7. This routine is executed by the ECU 8 repeatedly at predetermined regular intervals.

In the failure diagnosis routine, first in step S101, the ECU 8 determines whether or not the value of a failure flag is "0". The failure flag is a memory area prepared in advance in a RAM or backup RAM incorporated in the ECU 8. When it is diagnosed in this routine that the reducing agent addition valve 7 has a failure, the flag is set to "1", and when it is diagnosed that the reducing agent addition valve 7 is working properly, the flag is set to "0".

If the result of the determination in step S101 is affirmative (i.e. the failure flag=0), the process of the ECU 8 proceeds to step S102, where a determination is made as to whether or not a condition for performing failure diagnosis is satisfied. The condition for performing failure diagnosis may be, for example, that the fuel injection valve 3 is working properly, that the A/F sensor 11 is active, and/or that the temperature in the exhaust system (the temperature of the exhaust gas and the temperature of the exhaust gas purification catalyst 6 etc.) is in a temperature range in which added fuel and post-injected fuel can be vaporized.

If the determination in step S102 is affirmative, the process of the ECU 8 proceeds to step S103, where a determination is made as to whether or not the value of a post injection flag is "0". The post injection flag is a memory area prepared in advance in the RAM or backup RAM incorporated in the ECU 8. When it is diagnosed in the later-described process in steps S104 to S115 that the reducing agent addition valve does not have a failure, the post injection flag is set to "1", and when the determination in step S101 or S102 is negative, the post injection flag is set to "0" (see the description of step S118).

If the determination in step S103 is affirmative (i.e. the post injection flag=0), the ECU 8 executes, in steps S104 through S107, failure diagnosis for the reducing agent addition valve 7 by a conventional method mentioned before. The failure diagnosis according to a conventional method in step S104 through S107 is performed in order to detect obvious failure such as that the reducing agent addition valve 7 cannot add fuel (i.e. the fuel addition quantity is substantially zero) or that leakage of fuel through the reducing agent addition valve 7 is occurring.

In step S104, the ECU 8 controls the reducing agent addition valve 7 to cause it to add fuel into the exhaust gas.

In step S105, the ECU 8 calculates the integrated value of the added fuel quantity (i.e. the prescribed addition quantity) Qads prescribed for the reducing agent addition valve 7.

In step S106, the ECU 8 calculates the estimated addition quantity Qad by substituting the measurement value Ga of the air flow meter 9, the measurement value Maf of the A/F sensor 11 and the fuel injection quantity Inj prescribed by the ECU 8 for the fuel injection valve 3, into the above mentioned equation (1).

In step S107, the ECU 8 determines whether not the absolute value of the difference between the prescribed addition quantity Qads calculated in step S105 and the estimated addition quantity Qad calculated in step S106 ($=|Qads-Qad|$) is equal to or smaller than a predetermined quantity Va. Here, the predetermined quantity Va is, for example, a relatively large value smaller than or equal to the prescribed addition quantity Qads.

If the determination in step S107 is negative ($|Qpads-Qad|>Va$), it is considered that there is an obvious failure in the reducing agent addition valve 7, and the process proceeds to step S109. In step S109, the ECU 8 sets the aforementioned failure flag to "1" and terminates execution of this routine.

If the determination in step S107 is affirmative ($|Qads-Qad|\leq Va$), the process of the ECU 8 proceeds to step S108. In step S108, the ECU 8 sets the aforementioned post injection flag to "1" and terminates execution of this routine. In the case where the post injection flag is set to "1" in S108, the ECU 8 should make a negative determination in step S103 (for the post injection flag=1) in the next execution of this routine.

If the determination in step S103 is negative, the process of ECU 8 proceeds to step S110. In step S110, the ECU 8 controls the fuel injection valve 3 to cause it to perform post injection (that is, for example, fuel injection performed during the exhaust stroke) in addition to fuel injection that contributes to combustion in the internal combustion engine 1.

In step S111, the ECU 8 calculates an integral value Qpsts of the quantity of post fuel injection (prescribed post injection quantity) prescribed for the fuel injection valve 3.

In Step S112, the ECU 8 calculates the estimated post injection quantity Qpst. Specifically, the ECU 8 calculates the estimated post injection quantity Qpst by substituting the measurement value Ga of the air flow meter 9, the measurement value Maf of the A/F sensor 11 and the fuel injection quantity Inj (post injection being excluded) prescribed for the fuel injection valve 3 by the ECU 8 into a equation (Qpst=Σ (Ga/Maf-Inj) similar to the aforementioned equation (1).

In step S113, the ECU 8 determines whether or not the absolute value of the difference between the prescribed post injection quantity Qpsts calculated in step S111 and the estimated post injection quantity Qpst calculated in step S112 ($=|Qpsts-Qpst|$) is equal to or smaller than a predetermined quantity Va.

If the determination in step S113 is affirmative ($|Qpsts-Qpst|\leq Va$), the process of the ECU 8 proceeds to step S114. In step S114, the ECU 8 determines whether or not the prescribed addition quantity Qads and the prescribed post injection quantity Qpsts are substantially equal to each other. Specifically, the ECU 8 determines whether or not the absolute value of the difference between the prescribed addition quantity Qads and the prescribed post injection quantity Qpsts ($=|Qpads-Qpsts|$) is equal to or smaller than a predetermined quantity α.

If the determination in step S114 is negative ($|Qads-Qpsts|>α$), in other words, if there is a relatively large difference between the prescribed addition quantity Qads and the prescribed post injection quantity Qpsts, the ECU 8 terminates execution of this routine.

On the other hand, if the determination in step S114 is affirmative ($|Qads-Qpsts|\leq α$), in other words, if the prescribed addition quantity Qads and the prescribed post injection quantity Qpsts are substantially equal to each other, the process of the ECU 8 proceeds to step S115.

In step S115, the ECU 8 determines whether or not the absolute value of the difference between the estimated addition quantity Qad calculated in step S106 and the estimated post injection quantity Qpst calculated in step S112 (=|Qad−Qpst|) is equal to or larger than a predetermined quantity Vb. The predetermined value Vb is a quantity significantly smaller than the aforementioned predetermined quantity Va.

If the determination in step S115 is affirmative (|Qad−Qpst|>Vb), it is considered that the reducing agent addition valve 7 has a failure, and the process of the ECU 8 proceeds to step S116. In step S116, the ECU 8 sets the failure flag to "1".

If the determination in step S115 is negative (|Qad−Qpst|≦Vb), it is considered that the reducing agent addition valve 7 does not have failure, and the process of the ECU 8 proceeds to step S117. In step S117, the ECU 8 sets the aforementioned failure flag to "0".

In the failure diagnosis method described above, since the estimated addition quantity Qad and the estimated post injection quantity Qpst are estimated based on the same parameters (namely, the measurement value of the air flow meter 9, the measurement value of the A/F sensor 11 and the fuel injection quantity prescribed for the fuel injection valve 3 by the ECU 8), the estimated addition quantity Qad and the estimated post injection quantity Qpts contain the same errors.

Therefore, accurate failure diagnosis can be achieved irrespective of the above mentioned errors by diagnosing a failure of the reducing agent addition valve 7 using as a parameter the difference between the estimated addition quantity Qad and the estimated post injection quantity Qpst.

If the air-fuel ratio of the exhaust gas is smaller than the theoretical air-fuel ratio (stoichiometric air-fuel ratio) at the time of estimating the estimated post injection quantity Qpst and the estimated addition quantity Qad, there is a possibility that the degree of correlation between the actual post injection quantity or fuel addition quantity and the measurement value of the A/F sensor 11 becomes low depending on the oxygen storage capacity ($O_2$ storage capacity) of the exhaust gas purification catalyst 6, various oxidation/reduction reactions (e.g. NOx reduction reaction) in the exhaust gas purification catalyst 6 and/or slipping of surplus fuel through the exhaust gas purification catalyst 6.

In view of this, at the time of estimating the estimated post injection quantity Qpst and the estimated addition quantity Qad, the prescribed post injection quantity Qpsts and prescribed addition quantity Qads may be set in such a way that the air-fuel ratio of the exhaust gas becomes a slightly lean air-fuel ratio (e.g. about 18) that is a little higher than the theoretical air-fuel ratio.

In the case where the prescribed post injection quantity Qpsts and the prescribed addition quantity Qads are set in this way, the degree of correlation between the actual post injection quantity and the measurement value of the A/F sensor 11 and the degree of correlation between the actual fuel addition quantity and the measurement value of the A/F sensor 11 are increased, and accuracy of estimation of the estimated post injection quantity Qpst and the estimated addition quantity Qad are enhanced accordingly. Consequently, accuracy of diagnosis of a failure of the reducing agent addition valve 7 can also be enhanced.

Since the A/F sensor 11 has a response delay, it is desirable that the time over which the air-fuel ratio of the exhaust gas is kept at a slightly lean air-fuel ratio be made as long as possible.

Second Embodiment

In the following a second embodiment of the present invention will be described with reference to FIG. 4. Here, features that are not found in the above described first embodiment will be described, and features the same as those in the first embodiment will not be further described.

In this embodiment described in the following, the estimated post injection quantity Qpst and the estimated addition quantity Qad obtained in the failure diagnosis according to the first embodiment described above are used to correct the prescribed addition quantity Qads in the subsequent processing.

Figure 4:
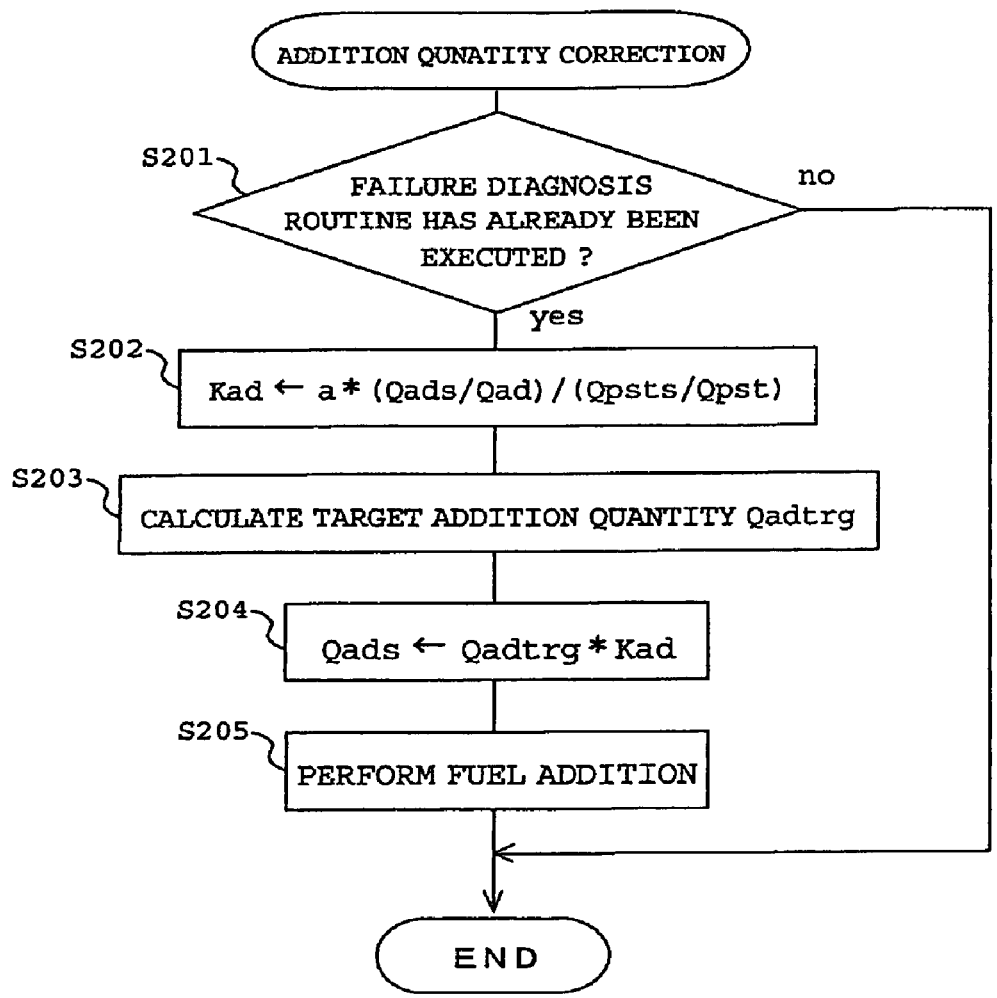
FIG. 4 is a flow chart of an addition quantity correction routine.

FIG. 4 is a flow chart of an addition quantity correction routine for correcting the prescribed addition quantity Qads.

Figure 3:
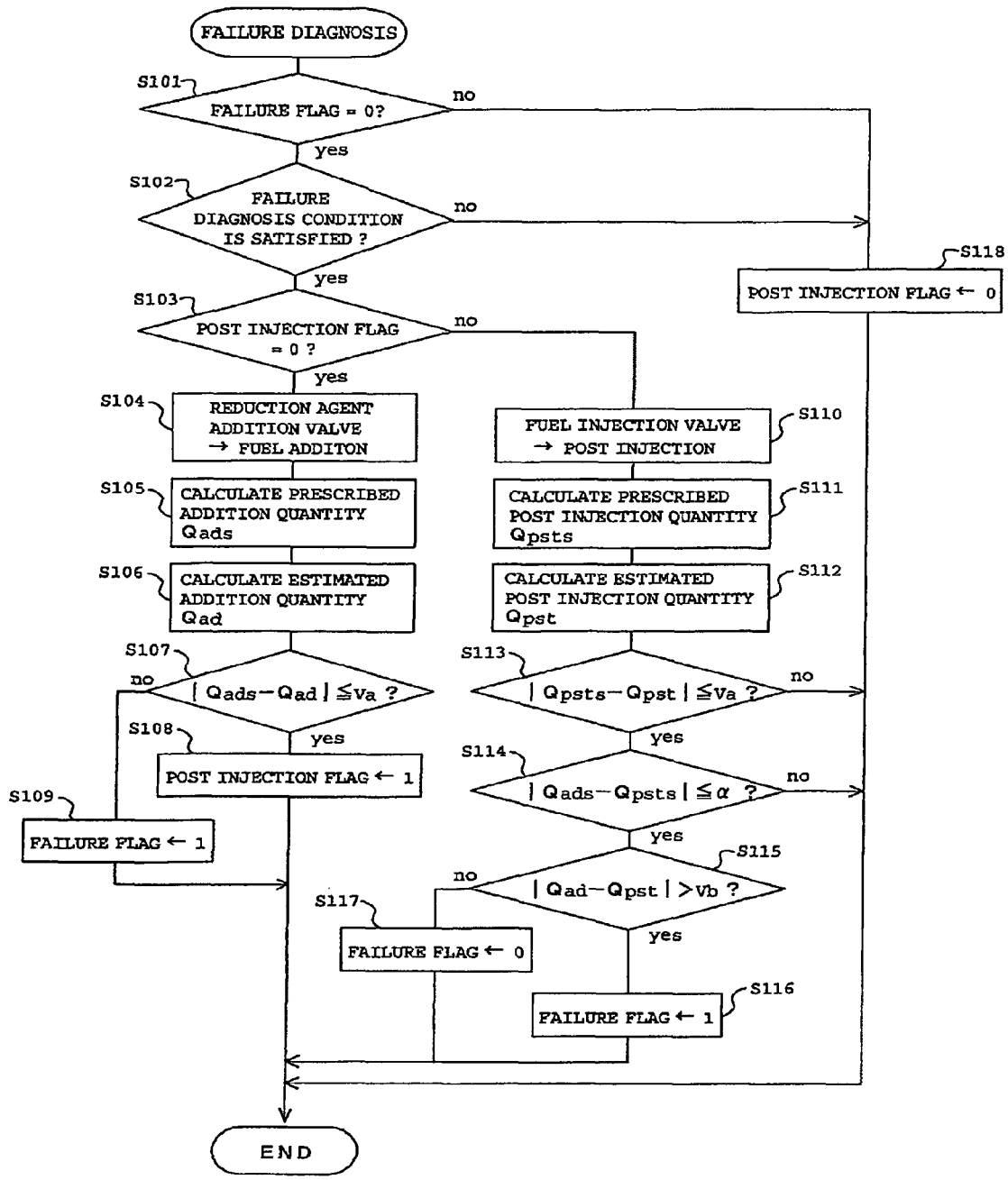
FIG. 3 is a flow chart of a failure diagnosis routine for diagnosing a failure of a reducing agent addition valve.

In the addition quantity correction routine, first in step S201, the ECU 8 determines whether or not the above-descried failure diagnosis routine shown in FIG. 3 has already been executed. In other words, a determination is made as to whether or not the estimated post injection quantity Qpst and the estimated addition quantity Qad have already been calculated.

If the determination in step S201 is negative, the ECU 8 terminates execution of this routine. On the other hand, if the determination in step S201 is affirmative, the process of the ECU 8 proceeds to step S202.

In step S202, the ECU 8 calculates a flow rate correction coefficient Kad for the reducing agent addition valve 7 based on the estimated post injection quantity Qpst, estimated addition quantity Qad, prescribed post injection quantity Qpsts and the prescribed addition quantity Qads obtained in the above described failure diagnosis routine shown in FIG. 3

Specifically, the ECU 8 calculates the flow rate correction coefficient Kad by substituting the aforementioned estimated post injection quantity Qpst, estimated addition quantity Qad, prescribed post injection quantity Qpsts and prescribed addition quantity Qads into the following equation (2):

$$Kad = a \times (Qads/Qad)/(Qpsts/Qpst) \qquad (2)$$

where a is a coefficient that has been determined experimentally in advance.

In step S203, the ECU 8 calculates a target addition quantity Qadtrg for the reducing agent addition valve 7 using a parameter(s) such as the amount of NOx stored in the exhaust gas purification catalyst 6 and/or the amount of particulate matter trapped in the exhaust gas purification catalyst 6. A conventionally known method may be used in this calculation.

In step S204, the ECU 8 multiplies the target addition quantity Qadtrg calculated in step S203 by the flow rate correction coefficient Kad calculated in step S202 to obtain the prescribed addition quantity Qads (=Kad×Qadtrag).

In step S205, the ECU 8 performs fuel addition through the reducing agent addition valve 7 according to the prescribed addition quantity Qads (=Kad×Qadtrag) calculated in step S204.

By determining the prescribed addition quantity Qads based on the estimated post injection quantity Qpst that contains errors equivalent to those in the estimated addition quantity Qad as a reference, the actual addition quantity can be made closer to the target addition quantity Qadtrg even when there are errors in the parameters (a measurement error of the air flow meter 9, a measurement error of A/F sensor 11 and an error in the quantity of injection through the fuel addition valve 3) used in calculating the estimated addition quantity Qad.

Third Embodiment

In the following, a third embodiment of the present invention will be described with reference to FIGS. 5 to 7. Here, features that are not found in the above described first embodiment will be described, and features the same as those in the first embodiment will not be further described.

In this embodiment described in the following, diagnosis of a failure of the air flow meter 9, the exhaust gas temperature sensor 10 and the A/F sensor 11 is performed on condition that it is determined in the failure diagnosis according to the above described first embodiment that the reducing agent addition valve 7 is working properly.

Figure 5:
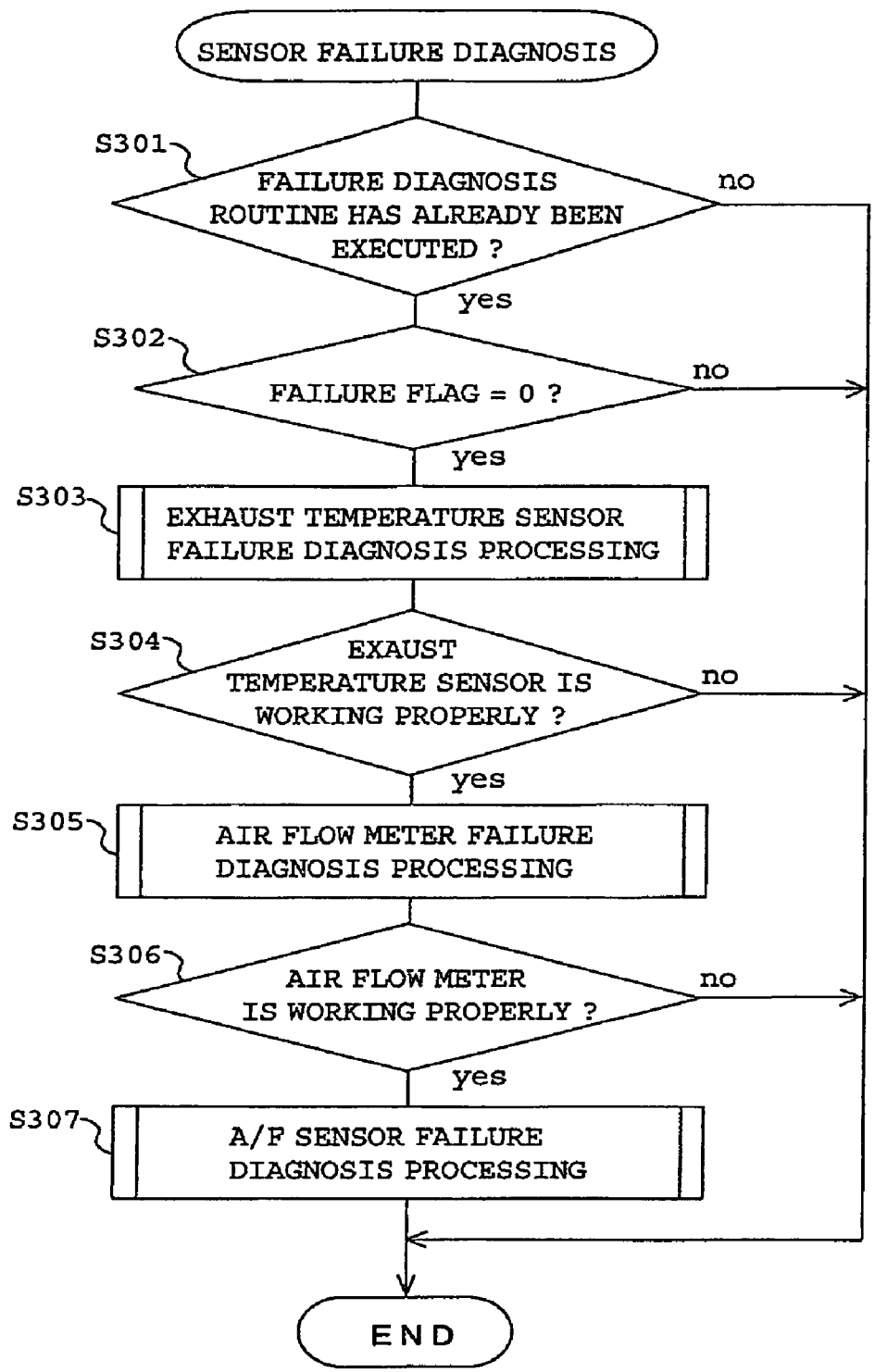
FIG. 5 is a flow chart of a sensor failure diagnosis routine for diagnosing a failure of an exhaust gas temperature sensor, air flow meter and A/F sensor.

FIG. 5 is a flow chart of a sensor failure diagnosis routine for diagnosing a failure of the air flow meter 9, the exhaust gas temperature sensor 10 and the A/F sensor 11. In this sensor failure diagnosis routine, first in step S301, the ECU 8 determines whether or not the above described failure diagnosis routine shown in FIG. 3 has already been performed.

If the determination in step S301 is negative, the ECU 8 terminates execution of this routine. On the other hand, when the determination in step S301 is affirmative, the process of the ECU 8 proceeds to step S302.

In step S302, the ECU 8 determines whether or not the value of the failure flag is "0". In other words, the ECU 8 determines whether or not it has been determined that the reducing agent addition valve 7 is working properly.

If the determination in step S302 is negative (i.e. the failure flag=1), the ECU 8 terminates execution of this routine. On the other hand, if the determination in step S302 is positive, (i.e. the failure flag=0), the process of ECU 8 proceeds to step S303.

In step S303, the ECU 8 executes failure diagnosis processing for the exhaust temperature sensor 10. Specifically, the ECU 8 monitors the measurement value of the exhaust temperature sensor 10 at the time when fuel addition through the reducing agent addition valve 7 is performed and determines the rise ΔT in the measurement value.

In the case where fuel addition through the reducing agent addition valve 7 is normally performed, the fuel added through the reducing agent addition valve 7 is oxidized in the exhaust gas purification catalyst 6. The temperature of the exhaust gas purification catalyst 6 rises with reaction heat upon oxidation of fuel. The rise in the temperature of the exhaust gas purification catalyst 6 leads to a rise in the temperature of the exhaust gas flowing out of the exhaust gas purification catalyst 6. The temperature rise of the exhaust gas thus caused varies proportionally to the quantity of fuel added through the reducing agent addition valve 7.

Therefore, when the rise ΔT in the measurement value of the exhaust gas temperature sensor 10 is a value proportional to the prescribed addition quantity Qads, the exhaust gas temperature sensor 10 may be considered to be working properly.

Figure 6:
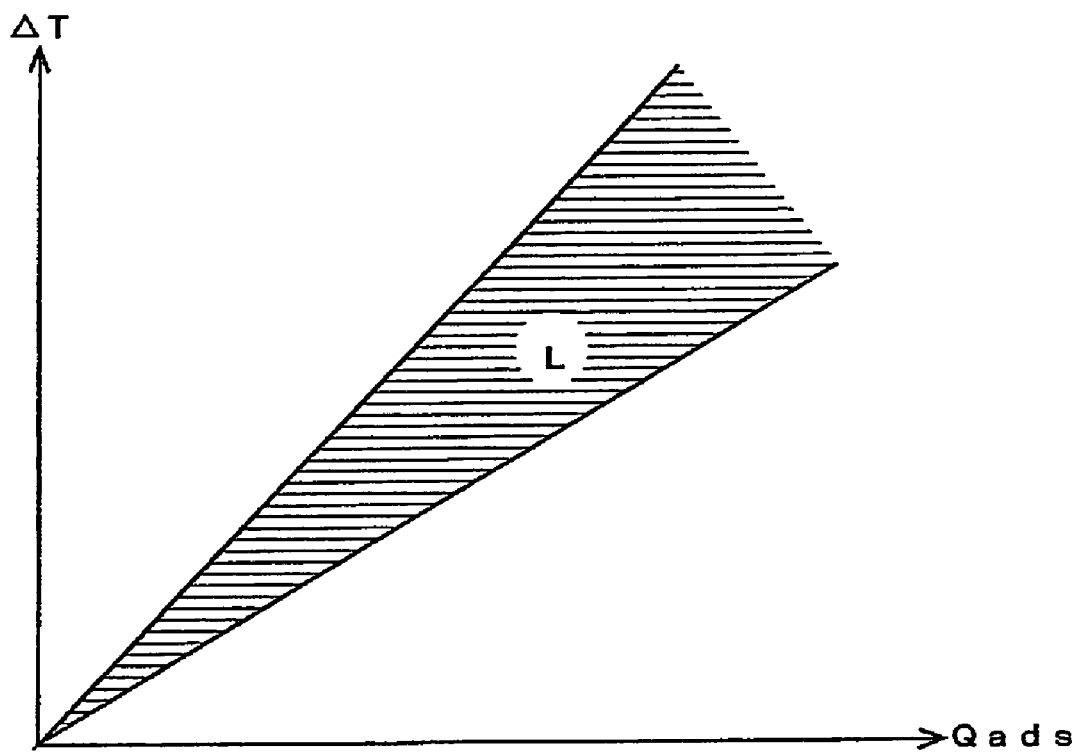
FIG. 6 is a graph showing the relationship between the rise $\Delta T$ in the temperature measured by an exhaust gas temperature sensor that is working properly and the prescribed addition quantity Qads.

In connection with this, the relationship between the prescribed addition quantity Qads and the rise ΔT in the measurement value of the exhaust gas temperature sensor 10 that is working properly may be obtained experimentally in advance as shown in FIG. 6. The hatched area L in FIG. 6 indicates the range of possible rises ΔT that can occur in the measurement value of the exhaust gas temperature sensor 10 that is working properly. This area is determined based on measurement errors that can occur in the exhaust gas temperature sensor 10.

If the rise ΔT in the measurement value of the exhaust gas temperature sensor 10 falls outside the range L determined from the prescribed addition quantity Qads, the ECU 8 makes a diagnosis that the exhaust gas temperature sensor 10 has a failure. On the other hand, if the rise ΔT in the measurement value of the exhaust gas temperature sensor 10 falls within the range L determined from the prescribed addition quantity Qads, the ECU 8 makes a diagnosis that the exhaust gas temperature sensor 10 does not have a failure.

Referring back to FIG. 5, in step S304, the ECU 8 determines whether or not the exhaust gas temperature sensor 10 is working properly. If the determination in step S304 is negative, the ECU 8 terminates execution of this routine. On the other hand, if the determination in step S304 is affirmative, the process of the ECU 8 proceeds to step S305.

In step S305, the ECU 8 executes failure diagnosis processing for the air flow meter 9. In the failure diagnosis processing for the air flow meter 9, the ECU 8 first calculates a prescribed addition quantity Qads that makes the air-fuel ratio of the exhaust gas equal to the theoretical air-fuel ratio using as parameters the measurement value Ga of the air flow meter 9 and the fuel injection quantity Inj prescribed for fuel injection valve 3 by the ECU 8. Specifically, the prescribed addition quantity Qads is calculated by substituting the measurement value Ga of the air flow meter 9 and the fuel injection quantity Inj into the following equation (3).

$$Qads = Ga/14.7 - Ga/Inj \qquad (3)$$

The ECU 8 controls the reducing agent addition valve 7 in accordance with the prescribed addition quantity Qads calculated from the above equation (3) and monitors the measurement value Maf of the A/F sensor 11. At that time, if the air flow meter 9 is working properly, the measurement value Maf of the A/F sensor 11 will be substantially equal to the theoretical air-fuel ratio.

Therefore, if the absolute value of the difference between the measurement value Maf of the A/F sensor 11 and the theoretical air-fuel ratio (=|Maf−14.7|) is smaller than a predetermined value, it may be diagnosed that the air flow meter 9 is working properly. Here, the predetermined value is determined in advance based on measurement errors that can occur in the A/F sensor 11 and the air flow meter 9.

The reason why the prescribed addition quantity Qads is determined in the failure diagnosis processing for the air flow meter 9 so that the air-fuel ratio of the exhaust gas becomes equal to the theoretical air-fuel ratio is that the A/F sensor 11 has higher measurement accuracy in the neighborhood of the theoretical air-fuel ratio.

Referring back to FIG. 5, after execution of step S305 described above, the process of the ECU 8 proceeds to step S306, where a determination is made as to whether or not the air flow meter 9 is working properly. If the determination in step S306 is negative, the ECU 8 terminates execution of this routine. On the other hand, if the determination in step S306 is affirmative, the process of the ECU 8 proceeds to step S307.

In step S307, the ECU 8 executes failure diagnosis processing for the A/F sensor 11. In the failure diagnosis processing for the A/F sensor 11, the ECU 8 calculates the estimated addition quantity Qad at the time when fuel is added through the reducing agent addition valve 7 and compares the estimated addition quantity Qad thus calculated and the prescribed addition quantity Qads.

The estimated addition quantity Qad that is calculated at times when the reducing agent addition valve 7, the air flow meter 9 and the A/F sensor 11 are working properly will be substantially equal to the prescribed addition quantity Qads. On the other hand, the estimated addition quantity Qad that is calculated at times when at least one of the reducing agent addition valve 7, the air flow meter 9 and the A/F sensor 11 has a failure will be significantly different from the prescribed addition quantity Qads. If it has been diagnosed that both the reducing agent addition valve 7 and the air flow meter 9 are working normally, it may be determined that the A/F sensor 11 has a failure.

Therefore, if the estimated addition quantity Qad calculated at times when the reducing agent addition valve 7 and the air flow meter 9 are working properly is significantly different from the prescribed addition quantity Qads, it may be diagnosed that the A/F sensor 11 has a failure.

Figure 7:
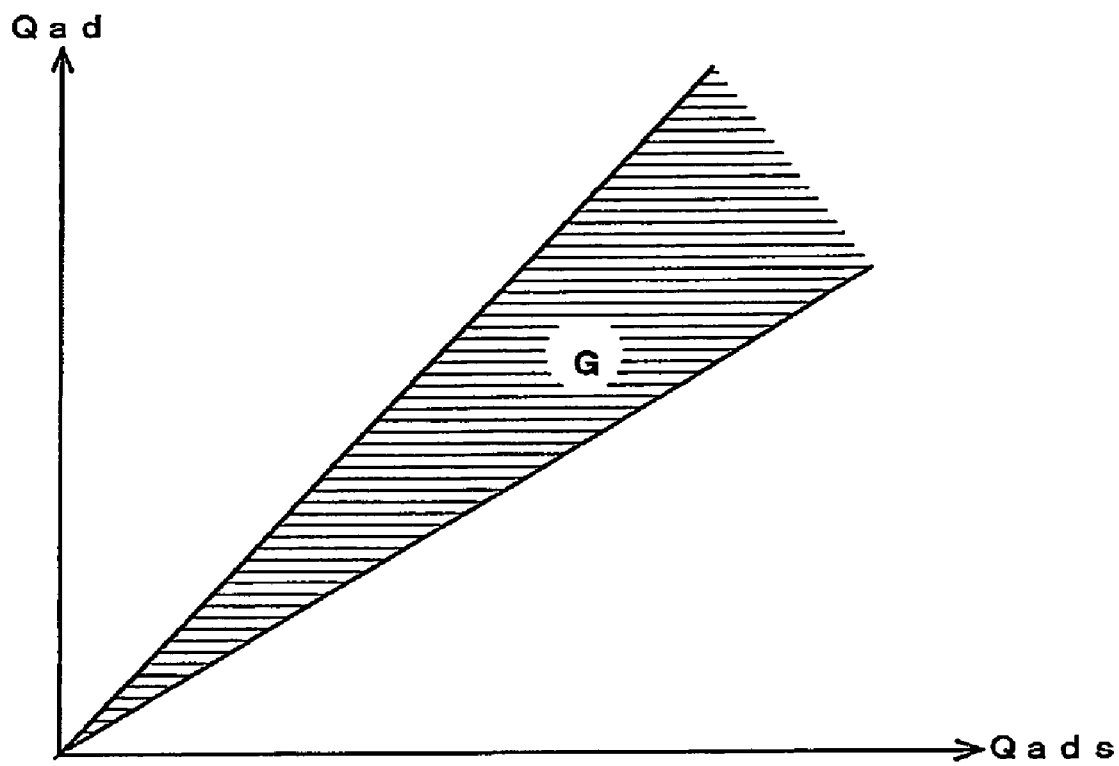
FIG. 7 is a graph showing the relationship between the estimated addition quantity Qad and the prescribed addition quantity Qads in situations where the reducing agent addition valve, air flow meter and A/F sensor are working properly.

In view of the above, the relationship between the prescribed addition quantity Qads and the estimated addition quantity Qad calculated at times when the reducing agent addition valve 7, the air flow meter 9 and the A/F sensor 11 are working properly may be obtained experimentally in advance as shown in FIG. 7. The hatched area G in FIG. 7 indicates the range of values that the estimated addition quantity Qad can assume at times when the reducing agent addition valve 7, the air flow meter 9 and the A/F sensor 11 are working properly. This area is determined based on possible errors in the quantity of fuel added through the reducing agent addition valve 7 and measurement errors that can occur in the air flow meter 9 and the A/F sensor 11.

If the estimated addition quantity Qad does not fall within the range G that is determined from the prescribed addition quantity Qads, the ECU 8 makes a diagnosis that the A/F sensor 11 has a failure.

With execution of the sensor failure diagnosis routine by the ECU 8 as described above, failures of the exhaust gas temperature sensor 10, the air flow meter 9, and the A/F sensor 11 can be diagnosed with high accuracy.

Fourth Embodiment

In the following, the fourth embodiment of the present invention will be descried with reference to FIGS. 8 to 12. Here, features that are not found in the above described first embodiment will be described, and features the same as those in the first embodiment will not be further described.

While in the above described first embodiment post injection through the fuel injection valve 3 and fuel addition through the reducing agent addition valve 7 are performed in different addition periods, in the fourth embodiment such post injection and fuel addition are performed at different timings during the same addition period.

Figure 8:
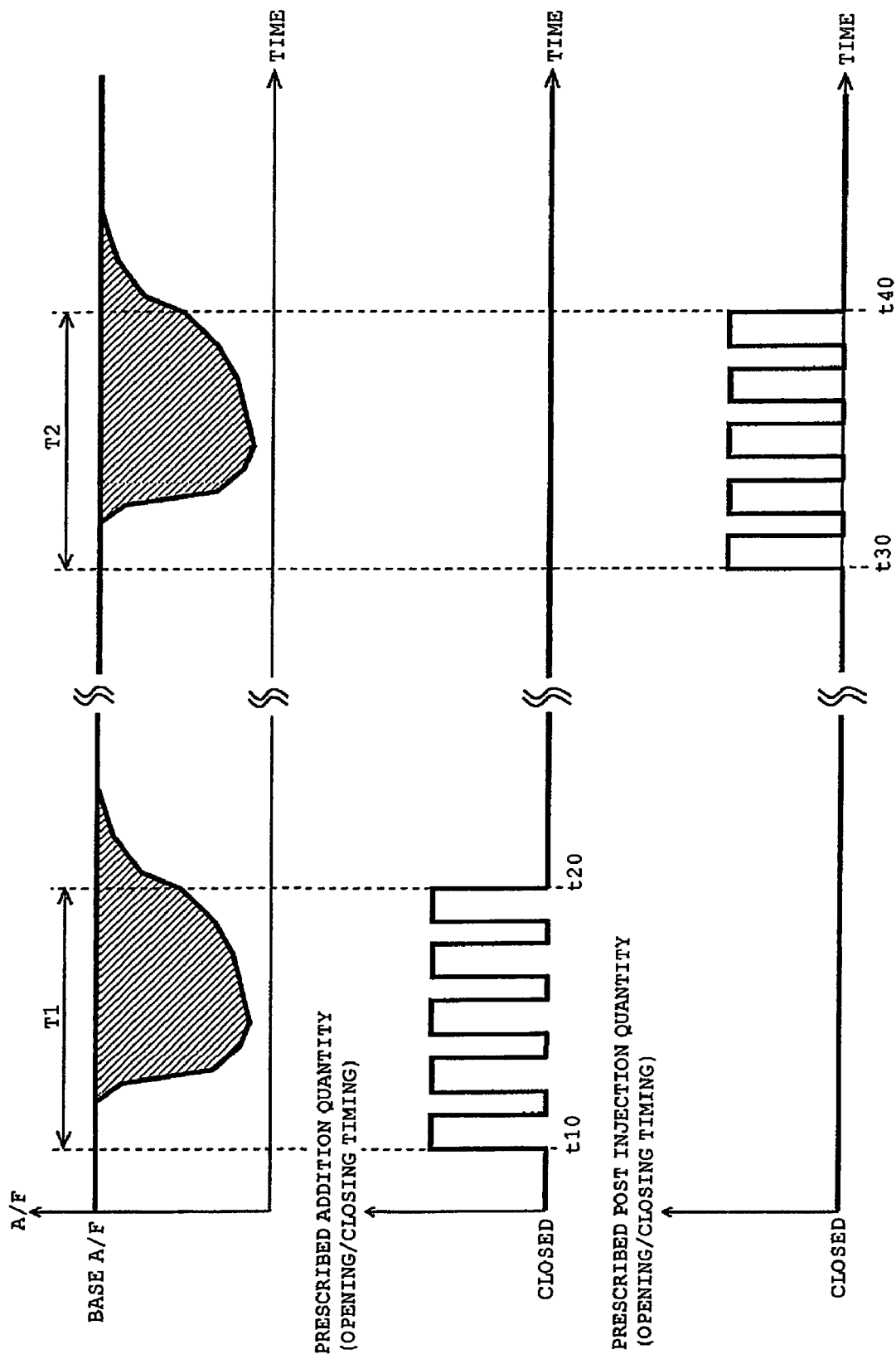
FIG. 8 is a timing chart of a failure diagnosis method according to a first embodiment.

FIG. 8 is a timing chart of a failure diagnosis method according to the above descried first embodiment. According to the failure diagnosis method according to the first embodiment, only either one the fuel injection valve 3 and the reducing agent addition valve 7 performs post injection or fuel addition during one addition period (i.e. period T1 between t10 and t20, and period T2 between t30 and t40 in FIG. 8).

Figure 9:
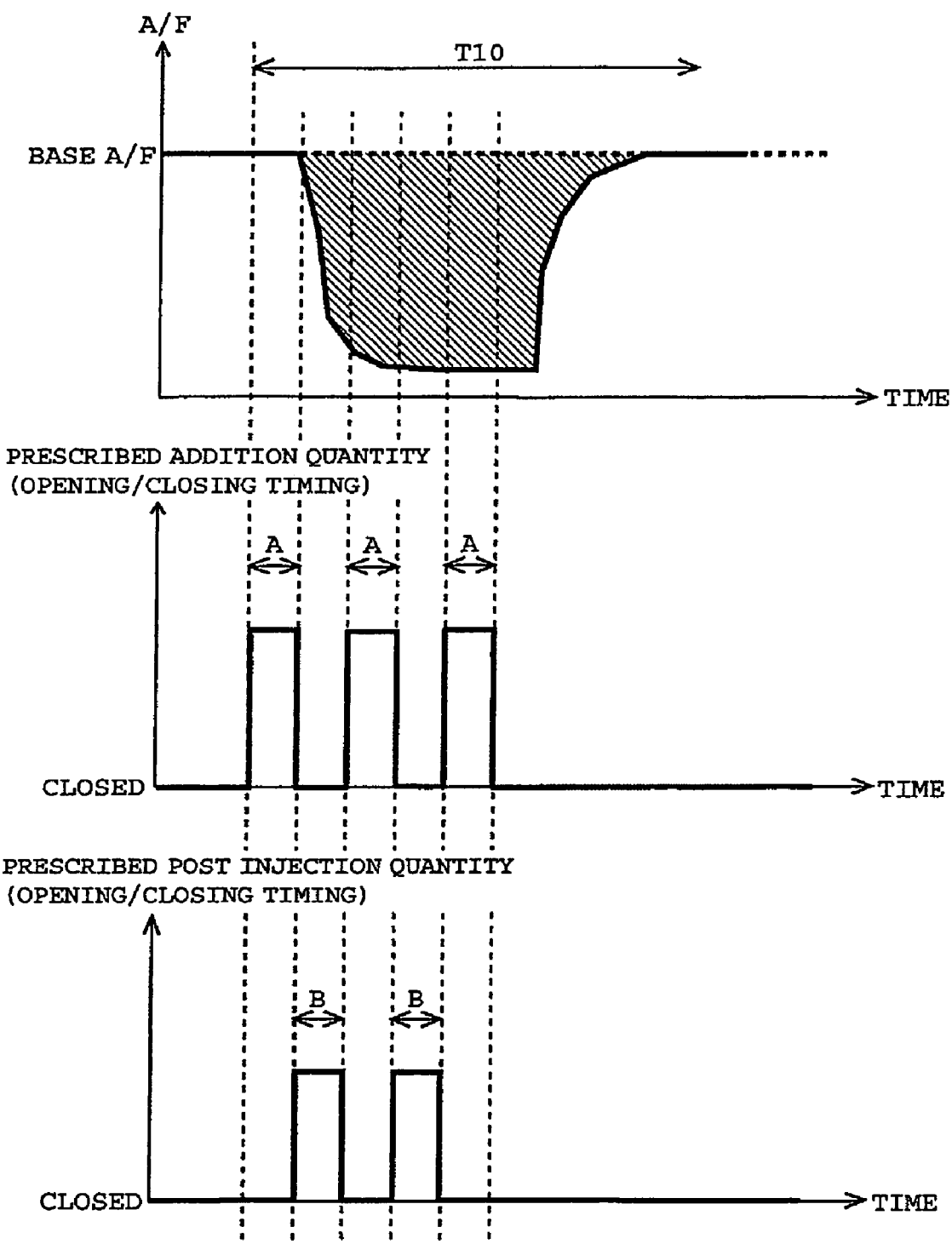
FIG. 9 is a first timing chart of a failure diagnosis method according to a fourth embodiment.

In contrast, according to the failure diagnosis method according to the fourth embodiment, the fuel injection valve 3 and the reducing agent addition valve 7 are controlled to perform post injection and fuel addition alternately and repeatedly in one addition period (i.e. period T10 in FIG. 9).

In this embodiment, the quantity of fuel injected in one post injection through the fuel injection valve 3 (i.e. the prescribed post injection quantity during period B in FIG. 9) and the prescribed addition quantity to be added through the reducing agent addition valve 7 at one time (i.e. the prescribed addition quantity during period A in FIG. 9) are designed to be equal to each other.

In the case where post injection through the fuel injection valve 3 and fuel addition through the reducing agent addition valve 7 are performed alternately in the same addition period as described above, the operating condition of the internal combustion engine 1 (e.g. the quantity of exhaust gas discharged from the internal combustion engine 1 and the quantity of injected fuel consumed in combustion in the internal combustion engine 1) and the condition of the exhaust gas purification catalyst 6 (e.g. the bed temperature of the exhaust gas purification catalyst 6 and the quantity of fuel consumed by the exhaust gas purification catalyst 6) are the same between at times of post injection through the fuel injection valve 3 and at times of fuel addition through the reducing agent addition valve 7. Therefore, the actual post injection quantity and the actual fuel addition quantity correlate with the measurement value of the A/F sensor 11.

For example, when the reducing agent addition valve 7 is working properly, the measurement value of the A/F sensor 11 is substantially the same at times of post injection through the fuel injection valve 3 and at times of fuel addition through the reducing agent addition valve 7. On the other hand, when the reducing agent addition valve 7 has a failure, the measurement value of the A/F sensor 11 increases or decreases every time post injection through the fuel injection valve 3 and fuel addition through the reducing agent addition valve 7 are switched over, as shown in FIG. 10.

Thus, the ECU 8 is configured to calculate the average of the measurement value of the A/F sensor 11 over the period B during which post injection through the fuel injection valve 3 is performed and the average of the measurement value of the A/F sensor 11 over the period A during which fuel addition through the reducing agent addition valve 7 is performed and to determine that the reducing agent addition valve 7 has a failure if the difference between these averages thus obtained is equal to or larger than a predetermined value.

Figure 10:
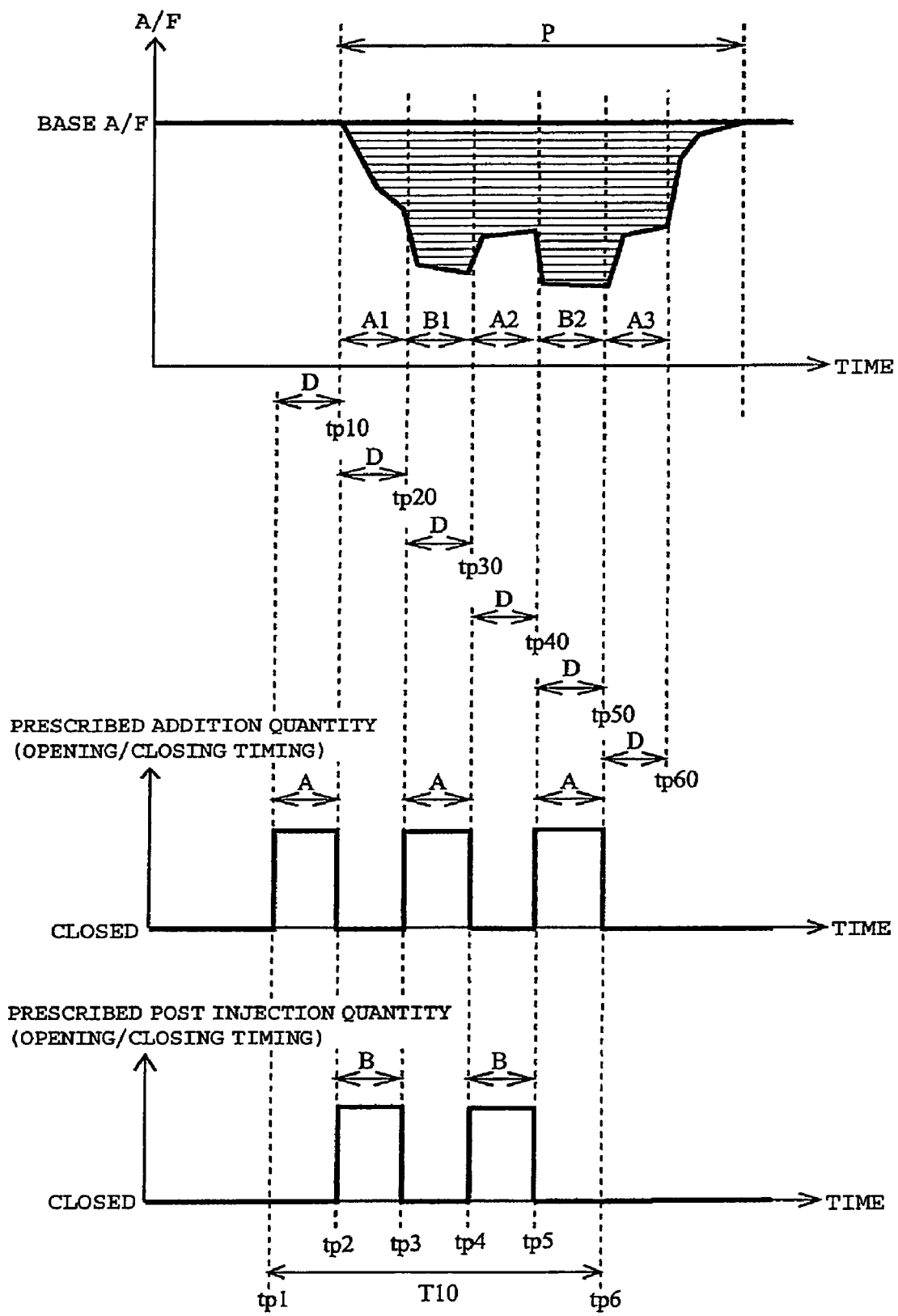
FIG. 10 is a second timing chart of the failure diagnosis method according to the fourth embodiment.

Specifically, during the period from the time at which the measurement value of the A/F sensor 11 starts to decrease from the base A/F to the time at which the measurement value returns to the base A/F (i.e. period P in FIG. 10), the ECU 8 reads the measurement value of the A/F sensor 11 at a time at which fuel added through the reducing agent addition valve 7 (which fuel will be referred to as "added fuel") reaches the A/F sensor 11 (during periods A1, A2 or A3 in FIG. 10) and reads the measurement value of the A/F sensor 11 at a time at which fuel injected by post injection through the fuel injection valve 3 (which fuel will be simply referred to as "post-injected fuel", hereinafter) reaches the A/F sensor 11 (during periods B1 or B2 in FIG. 10).

There is a time delay associated with transportation of the post-injected fuel and added fuel to the position of the A/F sensor 11. In the arrangement of this embodiment, since the reducing agent addition valve 7 is provided on the exhaust manifold as shown in FIG. 1 mentioned before, the transportation time delay until the post-injected fuel arrives at the position of the A/F sensor 11 and the transportation time delay until the added fuel arrives at the position of the A/F sensor 11 are substantially equal to each other.

In view of this, the ECU 8 is configured to read the measurement value of the A/F sensor 11 under the assumption that the added fuel reaches the A/F sensor 11 at transportation time delay D (at tp10, tp20 and tp30 in FIG. 10) after the start of fuel addition performed by the reducing agent addition valve 7 (at tp1, tp3 and tp5 in FIG. 10). In other words, the ECU 8 reads the measurement value of the A/F sensor 11 during one of periods A1, A2 and A3 in FIG. 10 (which will be referred to as "period An" hereinafter). (The measurement value thus read will be referred to as "fuel addition A/F" hereinafter.)

In addition, the ECU 8 is configure to read the measurement value of the A/F sensor 11 under the assumption that the post-injected fuel reaches the A/F sensor 11 at transportation time delay D (at tp20 and tp40 in FIG. 10) after the start of post injection performed by the fuel injection valve 3 (at tp2 and tp4 in FIG. 10). In other words, the ECU 8 reads the measurement value of the A/F sensor 11 during one of periods B1 and B2 in FIG. 10 (which will be referred to as "period Bn" hereinafter). (The measurement value thus read will be referred to as "post injection A/F" hereinafter.)

It is preferred that period An and period Bn be successive periods. When period An and period Bn are successive, the operating condition of the internal combustion engine 1 and the condition of the exhaust gas purification catalyst 6 are substantially the same between in period An and in period Bn. Accordingly, a difference in the measurement values of the A/F sensor 11 is hardly caused by factors other than the difference between the actual fuel addition quantity and the actual post-injected fuel quantity.

The ECU 8 calculates the average A/Finj of the fuel addition A/F over period An and the average A/Fpst of the post injection A/F over period Bn. The ECU 8 calculates the absolute value of the difference between the average A/Finj of the fuel addition A/F and the average A/Fpst of the post injection A/F (=|A/Finj−A/Fpst|) and determines that the reducing agent addition valve 7 has a failure if the difference thus calculated is equal to or larger than a predetermined quantity.

According to the above described failure diagnosis method, since failure diagnosis for the reducing agent addition valve 7 is performed using as parameters the fuel addition A/F and the post injection A/F that are measured under substantially the same condition in terms of the operating condition of the internal combustion engine 1 and the condition of the exhaust gas purification catalyst 6, accuracy of diagnosis can be further improved.

Figure 11:
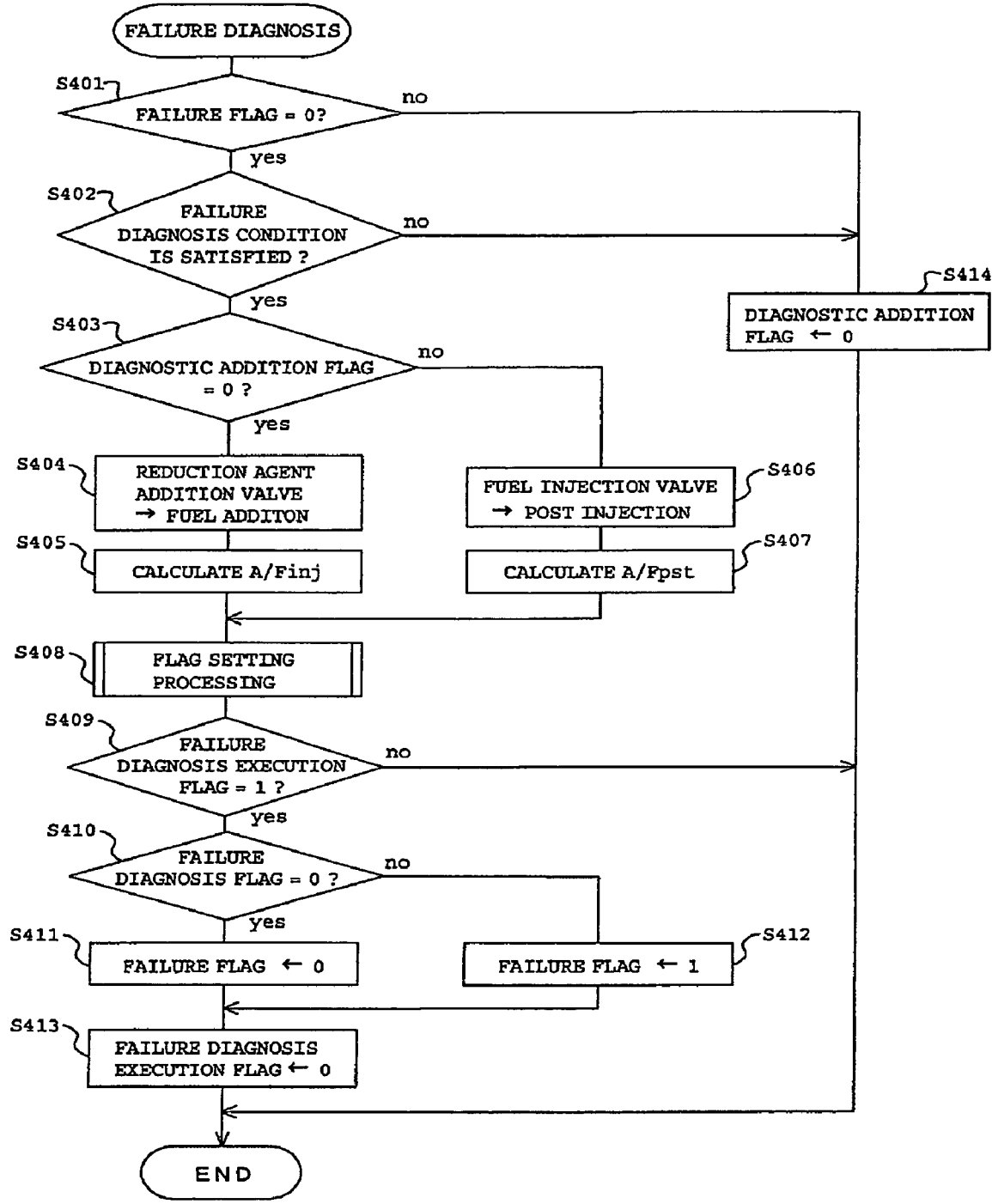
FIG. 11 is a flow chart of the failure diagnosis routine according to the fourth embodiment.

In the following, the failure diagnosis method according to this embodiment will be described with reference to FIGS. 11 and 12. FIG. 11 is a flow chart of a failure diagnosis routine for the reducing agent addition valve 7. This failure diagnosis routine is executed by the ECU 8 repeatedly at predetermined time intervals.

In the failure diagnosis routine, first in step S401, the ECU 8 determines whether or not the value of a failure flag is "0". The failure flag is a memory area prepared in advance in the RAM or backup RAM incorporated in the ECU 8. When it is diagnosed in this routine that the reducing agent addition valve 7 has a failure, the flag is set to "1", and when it is diagnosed that the reducing agent addition valve 7 is working properly, the flag is set to "0".

If the determination in step S401 is affirmative (i.e. the failure flag=0), the process of the ECU 8 proceeds to step S402, where a determination is made as to whether or not a condition for performing failure diagnosis is satisfied. The condition for performing failure diagnosis may be, for example, that the fuel injection valve 3 is working properly, that the A/F sensor 11 is active, that the temperature of the exhaust system (the temperature of the exhaust gas or the temperature of the exhaust gas purification catalyst 6 etc.) is in a temperature range in which added fuel and post-injected fuel can be vaporized, and/or that the internal combustion engine 1 is in a stationary running state.

If the determination in step S401 is negative (i.e. the failure flag=1), or if the determination in step S402 is negative, the ECU 8 sets a diagnostic addition flag to "1" and once terminates execution of this routine.

The diagnostic addition flag is a memory area prepared in advance in the RAM or backup RAM of the ECU 8. During the periods shown in FIG. 10 in which added fuel comes to the A/F sensor 11 (i.e. periods A1, A2 and A3), the diagnostic addition flag is set to "1", and during the periods in which post-injected fuel comes to the A/F sensor 11 (i.e. periods B1 and B2), the flag is set to "0". In addition, when the failure diagnosis is not performed, the diagnostic addition flag is set to "1" as discussed in the description of step S414.

If the determination in step S402 is affirmative, the process of the ECU 8 proceeds to step S403, where a determination is made as to whether or not the value of the diagnostic addition flag is "1".

If the determination in step S403 is affirmative, the process of the ECU 8 proceeds to step S404, where the ECU 8 causes the reducing agent addition valve 7 to add fuel for a predetermined period of time (equivalent to period A in FIG. 9).

In step S405, the ECU 8 monitors the measurement value of the A/F sensor 11 (i.e. the fuel addition A/F) during a period (period An) in which the fuel added through the reducing agent addition valve 7 in step S404 comes to the A/F sensor 11 and calculates the average A/Finj of the fuel addition A/F over that period An.

On the other hand, if the determination in step S403 is negative, the process of the ECU 8 proceeds to step S406, where the ECU 8 causes the fuel injection valve 3 to perform post injection over a predetermined period of time (equivalent to period B in FIG. 9).

In this embodiment, the quantity of fuel injected per unit time in post injection by the fuel injection valve 3 and the quantity of fuel added per unit time by the reducing agent addition valve 7 are equal to each other, and the prescribed addition quantity and the prescribed post injection quantity are equal to each other. Therefore, the duration of period A and the duration of period B are equal to each other.

In step S407, the ECU 8 monitors the measurement value of the A/F sensor 11 (i.e. the post injection A/F) during a period (period Bn) in which the fuel injected through the fuel injection valve 3 by post injection in step S406 comes to the A/F sensor 11 and calculates the average A/Fpst of the post injection A/F over that period Bn.

Figure 12:
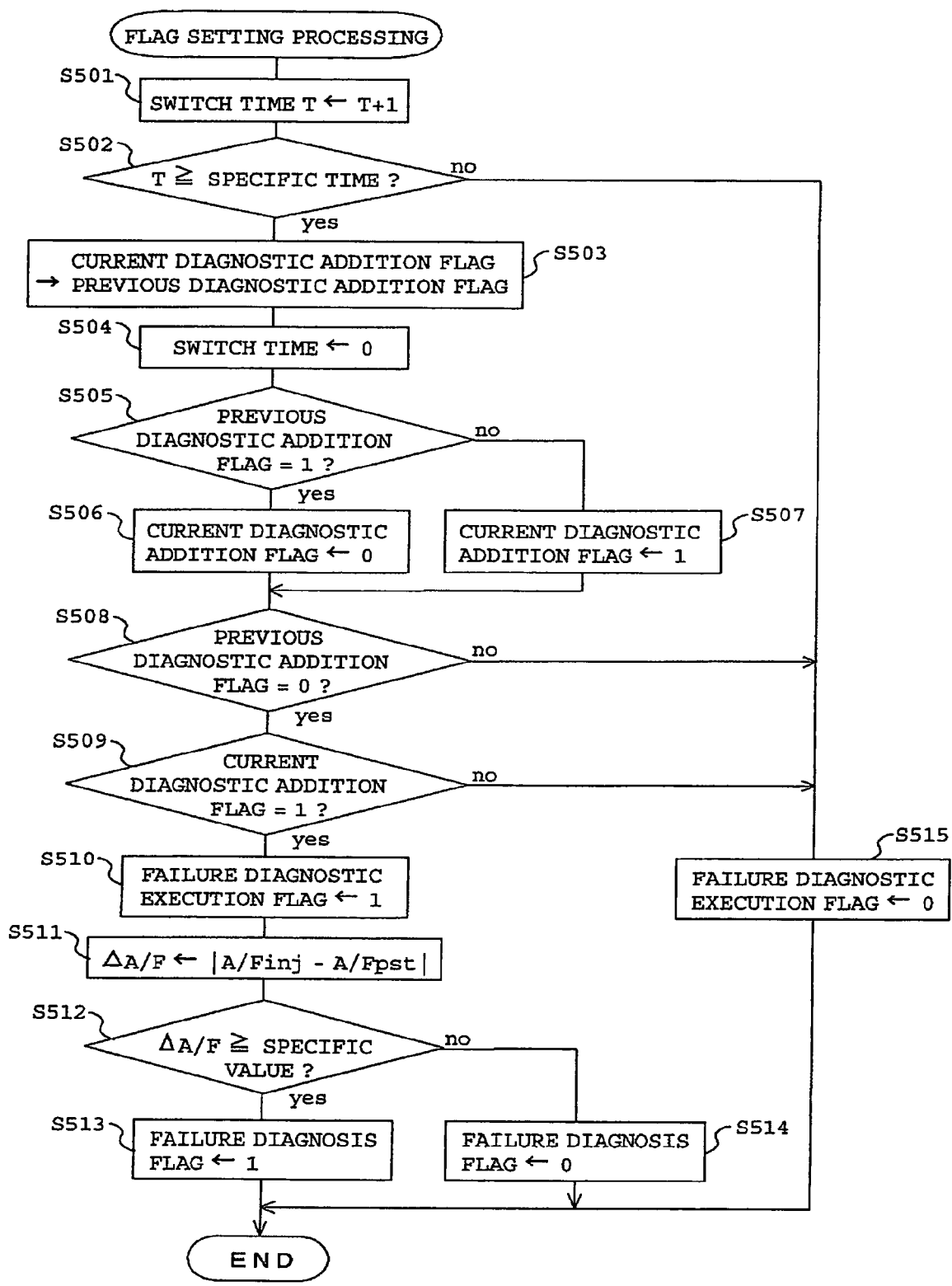
FIG. 12 is a flow chart of a subroutine for flag setting processing.

After completion of the processing of step S405 or S407, the process of the ECU 8 proceeds to step S408, where the ECU 8 executes processing for setting various flags according to a subroutine shown in FIG. 12. FIG. 12 is a flow chart of a subroutine of flag setting processing.

First in step S501 in FIG. 12, the ECU 8 increments the value of a counter T by one. The counter T is adapted to count the execution time of post injection performed by the fuel injection valve 3 and the execution time of fuel addition performed by the reducing agent addition valve 7.

In step S502, the ECU 8 determines whether or not the value T of the counter T is equal to or longer than a specific time. The specific time is equivalent to the duration of period A and period B.

If the determination in step S502 is negative (i.e. T<the specific time), the ECU 8 sets a failure diagnosis execution flag to "0" in step S515 and terminates execution of this routine.

The failure diagnosis execution flag is a memory area prepared in advance in the RAM or backup RAM incorporated in the ECU 8. When both the average A/Finj of the fuel injection A/F and the average A/Fpst of the post injection A/F are calculated, the failure diagnosis execution flag is set to "1", and when the failure diagnosis is completed, it is set to "0".

If the determination in step S502 is affirmative (i.e. T≧the specific time), the process of the ECU 8 proceeds to step S503, where the current value of the diagnostic addition flag is stored in the RAM or backup RAM as the previous value of the diagnostic addition flag.

In step S504, the ECU 8 resets the value of the aforementioned counter T to 0.

In step S505, the ECU 8 determines whether or not the previous value of the diagnostic addition flag stored in the RAM or backup RAM in step S503 is "1".

If the determination in step S505 is affirmative (i.e. the diagnostic addition flag=1), the process of the ECU 8 proceeds to step S506, where the ECU 8 changes the value of the current value of the diagnostic addition flag from "1" to "0".

On the other hand, if the determination in step S505 is negative (i.e. the diagnostic addition flag=j), the process of the ECU 8 proceeds to step S507, where the ECU 8 changes the current value of the diagnostic addition flag from "0" to "1".

After completing execution of step S506 or S507, the ECU 8 determines, in step S508 and S509 whether or not both of fuel addition for failure diagnosis and post injection have been executed.

When the failure diagnosis is not performed, the diagnostic addition flag is set to "1". Therefore, when the failure diagnosis is started, fuel addition through the reducing agent addition valve 7 is first performed, and thereafter post injection through the fuel injection valve 3 is performed.

Accordingly, if both of fuel addition and post injection for failure diagnosis have been performed at least once, the previous value of the diagnostic addition flag stored in the aforementioned step S503 is "0" and the current value of the diagnostic addition flag updated in the aforementioned step S506 or S507 is "1".

In view of this, in step S508 and S509 a determination is made by the ECU 8 whether or not the precious value of the diagnostic addition flag is "0" and the current value of the diagnostic addition flag is "1".

If both of the determination in step S508 and the determination in step S509 are affirmative, it is considered that fuel addition and post injection for failure diagnosis have been executed at least once. In other words, if both of the determination in step S508 and the determination in step S509 are affirmative, it is considered that both of the processing of step S405 and the processing of step S407 in the failure diagnosis routine in FIG. 11 have already been executed at least once.

In this case, the process of the ECU 8 proceeds to step S510, where the value of the failure diagnosis execution flag is changed to "1". Then in step S511, the ECU 8 calculates the absolute value of the difference ΔA/F between the average A/Finj of the fuel addition A/F calculated in step S405 and the average A/Fpst of the post injection A/F calculated in step S407 (ΔA/F=|A/Finj−A/Fpst|).

In step S512, the ECU 8 determines whether or not the value ΔA/F calculated in step S511 is equal to or larger than a predetermined quantity.

If the determination in step S512 is affirmative (i.e. ΔA/F≧the predetermined quantity), the ECU 8 sets a failure diagnosis flag to "1" in step S513. On the other hand, if the determination in step S512 is negative (i.e. ΔA/F<the predetermined quantity), the ECU 8 sets the failure diagnosis flag to "0" in step S514.

The failure diagnosis flag is a memory area prepared in advance in the RAM or backup RAM of the ECU 8. When the aforementioned value ΔA/F is equal to or larger than the predetermined quantity, the failure flag is set to "1", and when the value ΔA/F is smaller than the predetermined quantity, the failure flag is set to "0".

If at least one of the determination in step S508 and the determination in step S509 is negative, it is considered that either one of fuel addition or post injection for failure diagnosis has not been executed at all. In other words, if at least one of the determination in step S508 and the determination in step S509 is negative, it is considered that either one of the processing of step S405 or the processing of step S407 in the failure diagnosis routine shown in FIG. 11 has not been executed yet.

In this case, the process of the ECU 8 proceeds to step S515, where the ECU 8 sets the aforementioned failure diagnosis execution flag to "0" and terminates execution of this subroutine.

Referring back to the failure diagnosis routine in FIG. 11, in step S409, the ECU 8 determines whether or not the value of the failure diagnosis execution flag is "1".

If the determination in step S409 is negative (i.e. the failure diagnosis execution flag=0), it is considered that either one of the processing of step S405 or the processing of step S407 in the failure diagnosis routine has not been executed yet as discussed in the above description of step S515 in FIG. 12, and the ECU 8 once terminates execution of this routine.

If the determination in step S409 is affirmative (i.e. the failure diagnosis execution flag=1), the process of the ECU 8 proceeds to step S410, where a determination is made as to whether or not the value of the failure diagnosis flag is "0". In other words, the ECU 8 determines whether or not the determination in step 512 in FIG. 12 is negative (ΔA/F<the predetermined quantity).

The affirmative determination in step S410 (i.e. the failure diagnosis flag=0) means that the absolute value of the difference ΔA/F between the average A/Finj of the fuel addition A/F and the average A/Fpst of the post injection A/F is smaller than the predetermined quantity. In this case, it is considered that the reducing agent addition valve 7 does not have a failure, and the ECU 8 sets the aforementioned failure flag to "0" in step S411.

On the other hand, the negative determination in step S410 (i.e. the failure diagnosis flag=1) means that the absolute value of the difference ΔA/F between the average A/Finj of the fuel addition A/F and the average A/Fpst of the post injection A/F is equal to or larger than the predetermined quantity. In this case, it is considered that the reducing agent addition valve 7 has a failure, and the ECU 8 sets the aforementioned failure flag to "1" in step S412.

After completion of the processing of step S411 or S412, the ECU 8 changes the value of the failure diagnosis execution flag from "1" to "0" in step S413, and then terminates execution of this routine.

In the failure diagnosis method described in the foregoing, failure diagnosis can be performed accurately, since the quantity of fuel actually added through the reducing agent addition valve 7 and the quantity of fuel actually injected by post injection through the fuel injection valve 3 are estimated based on the same parameter (i.e. the measurement value of the A/F sensor 11).

Furthermore, since the measurement value of the A/F sensor 11 used in estimating the actual fuel addition quantity and the measurement value of the A/F sensor 11 used in estimating the actual post injection quantity are obtained under substantially the same condition in regard to the operating condition of the internal combustion engine 1 and the condition of the exhaust gas purification catalyst 6, a difference in the measurement values of the A/F sensor 11 is hardly caused by factors other than the difference between the actual fuel addition quantity and the actual post injection quantity. Therefore, accuracy of diagnosis of a failure of the reducing agent addition valve 7 can be further improved.

What is claimed is:

1. A failure diagnosis method for a reducing agent addition valve that adds reducing agent to exhaust gas of an internal combustion engine, comprising:
    performing post injection through a fuel injection valve of said internal combustion engine and reducing agent addition through said reducing agent addition valve at different timings;
    estimating the quantity of fuel injected through said fuel injection valve when said post injection is performed and the quantity of reducing agent added through said reducing agent addition valve when said reducing agent addition is performed based on a same parameter; and
    making a diagnosis that said reducing agent addition valve has a failure on condition that the difference between the estimated fuel quantity and the estimated reducing agent quantity exceeds a predetermined quantity.

2. A failure diagnosis method for a reducing agent addition valve according to claim 1, wherein the post injection through said fuel injection valve and the reducing agent addition through said reducing agent addition valve are performed alternately during a same addition period.

3. A failure diagnosis method for a reducing agent addition valve according to claim 1, wherein said parameter comprises a measurement value of an air-fuel ratio sensor attached to an exhaust passage of said internal combustion engine.

4. A failure diagnosis method for a reducing agent addition valve according to claim 2, wherein said parameter comprises a measurement value of an air-fuel ratio sensor attached to an exhaust passage of said internal combustion engine.

5. A failure diagnosis method for a reducing agent addition valve according to claim 1, wherein said parameter comprises a measurement value of an intake air quantity sensor provided in an intake passage of said internal combustion engine, a measurement value of an air-fuel ratio sensor attached to an exhaust passage of said internal combustion engine and the quantity of injected fuel consumed in combustion of said internal combustion engine.

6. A failure diagnosis method for a reducing agent addition valve according to claim 2, wherein said parameter comprises a measurement value of an intake air quantity sensor provided in an intake passage of said internal combustion engine, a measurement value of an air-fuel ratio sensor attached to an exhaust passage of said internal combustion engine and the quantity of injected fuel consumed in combustion of said internal combustion engine.

7. A failure diagnosis method for a reducing agent addition valve according to claim 3, wherein detection of said parameter is performed at a time when the air fuel ratio of exhaust gas is higher than a theoretical air-fuel ratio.

8. A failure diagnosis method for a reducing agent addition valve according to claim 4, wherein detection of said parameter is performed at a time when the air fuel ratio of exhaust gas is higher than a theoretical air-fuel ratio.

9. A failure diagnosis method for a reducing agent addition valve according to claim 5, wherein detection of said parameter is performed at a time when the air fuel ratio of exhaust gas is higher than a theoretical air-fuel ratio.

10. A failure diagnosis method for a reducing agent addition valve according to claim 6, wherein detection of said parameter is performed at a time when the air fuel ratio of exhaust gas is higher than a theoretical air-fuel ratio.

11. A failure diagnosis method for a reducing agent addition valve according to claim 1, wherein a target addition quantity of said reducing agent addition valve is corrected based on the ratio of the estimated fuel quantity and the estimated reducing agent quantity.

12. A failure diagnosis method for a reducing agent addition valve according to claim 1, wherein when the reducing agent is added by said reducing agent addition valve after it is diagnosed that said reducing agent addition valve is working properly, a failure of an exhaust gas temperature sensor provided in said exhaust passage downstream of an exhaust gas purification catalyst is diagnosed based on a measurement value of the exhaust gas temperature sensor.

13. A failure diagnosis method for a reducing agent addition valve according to claim 5, wherein after it is diagnosed that said reducing agent addition valve is working properly, the reducing agent is added through said reducing agent addition valve so that the air-fuel ratio of exhaust gas becomes equal to a predetermined air-fuel ratio, and a failure of said intake air quantity sensor is diagnosed by comparing the air-fuel ratio measured by said air-fuel ratio sensor at that time and said predetermined air-fuel ratio.

14. A failure diagnosis method for a reducing agent addition valve according to claim 13, wherein upon addition of the reducing agent by said reducing agent addition valve after it is diagnosed that said intake air quantity sensor is working properly, the quantity of the reducing agent added through said reducing agent addition valve is estimated again, and a failure of said air-fuel ratio sensor is diagnosed by comparing the estimated reducing agent quantity and a predetermined reference value.

15. A failure diagnosis method for a reducing agent addition valve according to claim 2, wherein a target addition quantity of said reducing agent addition valve is corrected based on the ratio of the estimated fuel quantity and the estimated reducing agent quantity.

16. A failure diagnosis method for a reducing agent addition valve according to claim 2, wherein when the reducing agent is added by said reducing agent addition valve after it is diagnosed that said reducing agent addition valve is working properly, a failure of an exhaust gas temperature sensor provided in said exhaust passage downstream of an exhaust gas purification catalyst is diagnosed based on a measurement value of the exhaust gas temperature sensor.

17. A failure diagnosis method for a reducing agent addition valve according to claim 6, wherein after it is diagnosed that said reducing agent addition valve is working properly, the reducing agent is added through said reducing agent addition valve so that the air-fuel ratio of exhaust gas becomes equal to a predetermined air-fuel ratio, and a failure of said intake air quantity sensor is diagnosed by comparing the air-fuel ratio measured by said air-fuel ratio sensor at that time and said predetermined air-fuel ratio.

* * * * *

UNITED STATES PATENT AND TRADEMARK OFFICE
CERTIFICATE OF CORRECTION

PATENT NO.       : 7,849,672 B2
APPLICATION NO.  : 11/790028
DATED            : December 14, 2010
INVENTOR(S)      : Daisuke Shibata et al.

It is certified that error appears in the above-identified patent and that said Letters Patent is hereby corrected as shown below:

Title Page,

Item (73), Assignee: "Toyota Jidosha Kabushiki Kaisha, Toyota (JP)," should read --Toyota Jidosha Kabushiki Kaisha, Toyota (JP); Kabushiki Kaisha Toyota Jidoshokki, Kariya (JP)--

Signed and Sealed this
Twenty-sixth Day of July, 2011

David J. Kappos
*Director of the United States Patent and Trademark Office*